(12) United States Patent
Miyazaki et al.

(10) Patent No.: US 11,843,853 B2
(45) Date of Patent: Dec. 12, 2023

(54) IMAGE PICKUP APPARATUS INCLUDING DISPLAY DEVICE CAPABLE OF PROVIDING AN APPROPRIATE DISPLAY IMAGE AND CONTROL METHOD THEREFOR

(71) Applicant: CANON KABUSHIKI KAISHA, Tokyo (JP)

(72) Inventors: Takashi Miyazaki, Tokyo (JP); Yoichi Osada, Kanagawa (JP); Koichi Odagaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 247 days.

(21) Appl. No.: 17/219,427

(22) Filed: Mar. 31, 2021

(65) Prior Publication Data

US 2021/0314492 A1 Oct. 7, 2021

(30) Foreign Application Priority Data

Apr. 3, 2020 (JP) .................................. 2020-067880
Apr. 3, 2020 (JP) .................................. 2020-067881
Mar. 4, 2021 (JP) .................................. 2021-034709

(51) Int. Cl.
*H04N 23/63* (2023.01)
*H04N 5/92* (2006.01)
(Continued)

(52) U.S. Cl.
CPC ........... *H04N 23/63* (2023.01); *H04N 5/2628* (2013.01); *H04N 5/77* (2013.01); *H04N 5/9201* (2013.01);
(Continued)

(58) Field of Classification Search
CPC ........ H04N 23/63; H04N 5/2628; H04N 5/77; H04N 5/9201; H04N 23/531; H04N 23/54;
(Continued)

(56) References Cited

U.S. PATENT DOCUMENTS

2011/0052139 A1* 3/2011 Oku ....................... H04N 23/61
  348/222.1
2012/0113308 A1* 5/2012 Ishikawa .............. H04N 23/531
  348/373

(Continued)

FOREIGN PATENT DOCUMENTS

JP 2001-313862 A 11/2001

*Primary Examiner* — Gevell V Selby
(74) *Attorney, Agent, or Firm* — Cowan, Liebowitz & Latman, P.C.

(57) ABSTRACT

An image pickup apparatus capable of constantly providing a photographer with an appropriate display image even when a posture of the image pickup apparatus is changed is provided. An image pickup device and a main body including a display are connected by a hinge member rotatably about at least one axis. A first detector detects a rotation phase of the image pickup device about the one axis with respect to the main body. A second detector detects a posture of the image pickup device. A display controller performs a vertical inversion of a display of an image picked up by the image pickup device on the display in accordance with a detection result of the first detector and the second detector.

17 Claims, 24 Drawing Sheets

(51) Int. Cl.
　　　*H04N 5/77*　　　　(2006.01)
　　　*H04N 5/262*　　　(2006.01)
　　　*H04N 23/54*　　　(2023.01)
　　　*H04N 23/55*　　　(2023.01)
　　　*H04N 23/53*　　　(2023.01)
　　　*H04N 23/695*　　(2023.01)

(52) U.S. Cl.
　　　CPC ........... *H04N 23/531* (2023.01); *H04N 23/54* (2023.01); *H04N 23/55* (2023.01); *H04N 23/695* (2023.01)

(58) Field of Classification Search
　　　CPC .... H04N 23/55; H04N 23/695; H04N 9/8205; H04N 23/50; H04N 23/634
　　　See application file for complete search history.

(56) References Cited

U.S. PATENT DOCUMENTS

| | | | |
|---|---|---|---|
| 2015/0261393 A1* | 9/2015 | Sadatsuki | H04N 23/51 715/810 |
| 2019/0260863 A1* | 8/2019 | Kinouchi | H04N 23/57 |

* cited by examiner

FIG. 7A

| POSTURE DETERMINATION IN VERTICAL DIRECTION | | | | | | |
|---|---|---|---|---|---|---|
| FIRST ANGLE DETECTING UNIT | FIRST DIRECTION | | SECOND DIRECTION | | THIRD DIRECTION | |
| FIRST POSTURE DETECTING UNIT | FOURTH DIRECTION | FIFTH DIRECTION | FOURTH DIRECTION | FIFTH DIRECTION | FOURTH DIRECTION | FIFTH DIRECTION |
| DETERMINATION RESULT | NOT PERFORM VERTICAL INVERSION | | PERFORM VERTICAL INVERSION | | NOT PERFORM VERTICAL INVERSION | PERFORM VERTICAL INVERSION |

FIG. 7B

| POSTURE DETERMINATION IN LATERAL DIRECTION | | |
|---|---|---|
| SECOND ANGLE DETECTING UNIT | SIXTH DIRECTION | SEVENTH DIRECTION |
| DETERMINATION RESULT | NOT PERFORM LATERAL INVERSION | PERFORM LATERAL INVERSION |

*FIG. 10*

| POSTURE DETERMINATION IN VERTICAL DIRECTION ||||||
|---|---|---|---|---|---|---|
| FIRST ANGLE DETECTING UNIT | FIRST DIRECTION || SECOND DIRECTION || THIRD DIRECTION ||
| SECOND POSTURE DETECTING UNIT | EIGHTH DIRECTION | NINTH DIRECTION | EIGHTH DIRECTION | NINTH DIRECTION | EIGHTH DIRECTION | NINTH DIRECTION |
| DETERMINATION RESULT | NOT PERFORM VERTICAL INVERSION || PERFORM VERTICAL INVERSION || NOT PERFORM VERTICAL INVERSION | PERFORM VERTICAL INVERSION |

*FIG. 12*

| POSTURE DETERMINATION IN VERTICAL DIRECTION |||||
|---|---|---|---|---|
| FIRST POSTURE DETECTING UNIT | FOURTH DIRECTION || FIFTH DIRECTION ||
| SECOND POSTURE DETECTING UNIT | EIGHTH DIRECTION | NINTH DIRECTION | EIGHTH DIRECTION | NINTH DIRECTION |
| DETERMINATION RESULT | NOT PERFORM VERTICAL INVERSION | PERFORM VERTICAL INVERSION || NOT PERFORM VERTICAL INVERSION |

FIG. 16

| | ELEVENTH DIRECTION | | TWELFTH DIRECTION | | THIRTEENTH DIRECTION | | FOURTEENTH DIRECTION | |
|---|---|---|---|---|---|---|---|---|
| FIRST ANGLE DETECTING UNIT | across | | | | | | | |
| SECOND POSTURE DETECTING UNIT | EIGHTH DIRECTION | NINTH DIRECTION | EIGHTH DIRECTION | NINTH DIRECTION | EIGHTH DIRECTION | NINTH DIRECTION | EIGHTH DIRECTION | NINTH DIRECTION |
| THIRD ANGLE DETECTING UNIT | CLOSED / OPENED | CLOSED / OPENED | CLOSED / OPENED | CLOSED / OPENED | CLOSED / OPENED | CLOSED / OPENED | CLOSED / OPENED | CLOSED / OPENED |
| DETERMINATION RESULT | NOT PERFORM VERTICAL INVERSION | | PERFORM VERTICAL INVERSION | | NOT PERFORM VERTICAL INVERSION | | PERFORM VERTICAL INVERSION | NOT PERFORM VERTICAL INVERSION |

POSTURE DETERMINATION IN VERTICAL DIRECTION

DIRECTION OF GRAVITY

DIRECTION OF GRAVITY

IMAGE PICKUP APPARATUS INCLUDING DISPLAY DEVICE CAPABLE OF PROVIDING AN APPROPRIATE DISPLAY IMAGE AND CONTROL METHOD THEREFOR

BACKGROUND OF THE INVENTION

Field of the Invention

The present invention relates to an image pickup apparatus including a display device and a control method therefor.

Description of the Related Art

As a video streaming service using a communication network such as the Internet has been prevailed and it becomes possible to easily distribute a moving image, there is a demand for an image pickup apparatus capable of easily shooting an intended moving image and shooting a moving image with originality. For example, there is a demand for an image pickup apparatus capable of shooting a moving image in a free posture in various situations and shooting at various angles. Regarding such a demand, Japanese Laid-Open Patent Publication (kokai) No. 2001-313862 discloses an image pickup apparatus capable of switching a shooting direction by rotating a lens unit about one axis and capable of inverting a display of an image being shot on a display unit according to an orientation of the lens unit.

The image pickup apparatus disclosed in Japanese Laid-Open Patent Publication (kokai) No. 2001-313862 is able to easily perform switching between a direction of self-shooting and a direction of another-person shooting by, for example, rotating the lens unit about the one axis and is able to display a mirror image on the display unit when the self-shooting is performed.

However, in the technique disclosed in Japanese Laid-Open Patent Publication (kokai) No. 2001-313862, switching of an image displayed on the display unit is limited to a display switching associated with a rotation of the lens unit about the one axis and a manual display switching. For this reason, in some cases, a photographer cannot easily determine whether an intended video is being shot when the photographer sees a video being displayed on the display unit during the shooting.

SUMMARY OF THE INVENTION

The present invention provides an image pickup apparatus capable of constantly providing a photographer with an appropriate display image even when a posture of the image pickup apparatus is changed, and a control method therefor.

Accordingly, the present invention provides an image pickup apparatus comprising an image pickup device, a main body including a display, a hinge member that connects the image pickup device and the main body rotatably about at least one axis, and at least one processor, the at least one processor functioning in accordance with a program stored in a memory as a first detector that detects a rotation phase of the image pickup device about the one axis with respect to the main body, a second detector that detects a posture of the image pickup device, and a display controller that performs a vertical inversion of a display of an image picked up by the image pickup device on the display in accordance with detection results of the first detector and the second detector.

According to the present invention, it is possible to provide the image pickup apparatus capable of constantly providing the photographer with the appropriate display image even when the posture of the image pickup apparatus is changed.

Further features of the present invention will become apparent from the following description of exemplary embodiments with reference to the attached drawings.

BRIEF DESCRIPTION OF THE DRAWINGS

FIGS. 7A and 7B are diagrams useful in explaining contents switched on a display unit in the first embodiment.

FIG. 10 is a diagram useful in explaining contents switched on a display unit in the second embodiment.

FIG. 12 is a diagram useful in explaining contents switched on a display unit in the third embodiment.

FIG. 16 is a diagram useful in explaining contents switched on the display unit in the fourth embodiment.

DESCRIPTION OF THE EMBODIMENTS

The present invention will now be described in detail below with reference to the accompanying drawings showing embodiments thereof.

Figure 1A:
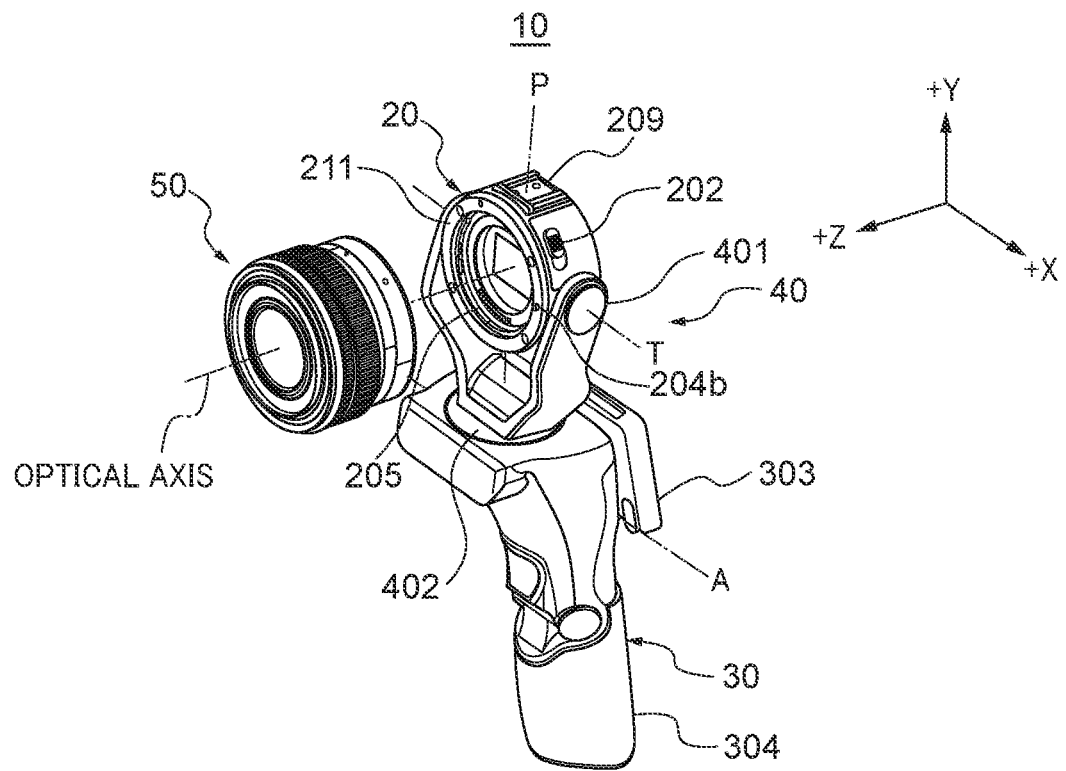
FIG. 1A and FIG. 1B are perspective views of an image pickup apparatus according to a first embodiment.
Figure 1B:
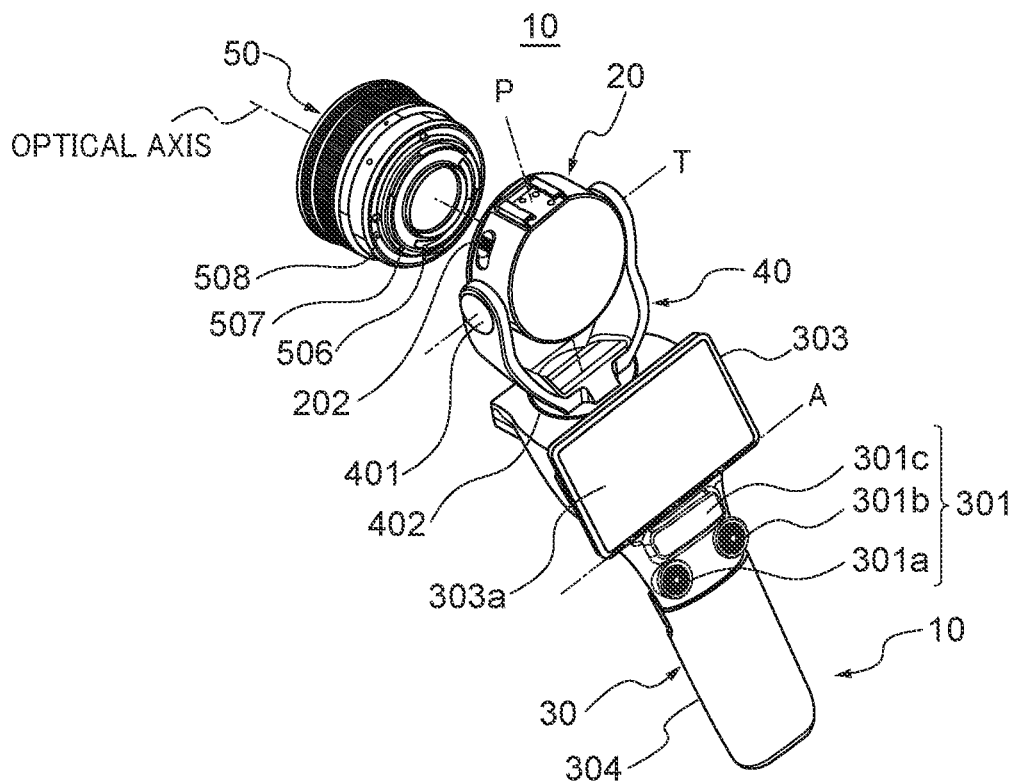

First of all, a description will be given of a first embodiment of the present invention. FIGS. 1A and 1B are perspective views of an image pickup apparatus 10 according to the first embodiment of the present invention. Parts unnecessary for an explanation are omitted in each of FIGS. 1A, 1B and following figures so as to clarify a configuration of the image pickup apparatus 10 necessary for the explanation.

The image pickup apparatus 10 is, specifically, a video camera capable of shooting a moving image. The image pickup apparatus 10 generally includes a movable unit 20 (movable member), a fixed unit 30 (main body), a hinge unit 40 (hinge member), and a lens unit (shooting lens). FIG. 1A is a perspective view showing a state of the image pickup apparatus 10 in which the lens unit 50 is removed from the movable unit 20 when viewed from diagonally forward. FIG. 1B is a perspective view of the state of the image pickup apparatus 10 in which the lens unit 50 is removed from the movable unit 20 when viewed from diagonally upward and backward.

A lens unit 50 is so called an interchangeable lens, and is attachable to the movable unit 20. The lens unit 50 and the movable unit 20 have a bayonet-type attaching structure, for example, and the lens unit 50 includes a bayonet pawl portion 507, and the movable unit 20 includes a lens mount 211.

When the lens unit 50 is attached to the movable unit 20, first, a protruding part of the bayonet pawl portion 507 is aligned with a notch formed inside of the lens mount 211. Then, the lens unit 50 is inserted into the movable unit 20 and rotated about an optical axis. As a result, the lens unit 50 is attached to the movable unit 20. In this case, in the lens mount 211, a movable pin 204b of a lens rotation restricting unit 204 (see, FIG. 2) which restricts a rotation of the lens unit 50 engages with a concave portion 508 provided in the lens unit 50. Accordingly, the rotation of the lens unit 50 with respect to the movable unit 20 is restricted, and this prevents the lens unit 50 from falling off from the movable unit 20.

When the lens unit 50 is removed from the movable unit 20, an operation unit 202 is operated to retract the movable pin 204b of the lens rotation restricting unit 204, and then the lens unit 50 is rotated in a direction opposite to a rotational direction at a time of attaching the lens unit 50 to the movable unit 20. Thereafter, the lens unit 50 is separated from the movable unit 20 after the protruding part of the bayonet pawl portion 507 is rotated to a position of the notch of the lens mount 211. A detail of an inner structure of the movable unit 20 including the operation unit 202 will be described below.

In a state in which the lens unit 50 is mounted on the movable unit 20, an interface unit 205 of the movable unit 20 and an interface unit 506 of the lens unit 50 are electrically connected with each other. In this state, the lens unit 50 and the movable unit 20 are able to mutually perform a communication. A system configuration (control system) of the image pickup apparatus 10 will be described below.

The movable unit 20 is connected to the fixed unit 30 rotatably in a tilting direction and a panning direction by the hinge unit 40. The hinge unit 40 is a biaxial hinge comprised of a tilting rotation hinge 401 and a panning rotation hinge 402. The tilting rotation hinge 401 is supports the movable unit 20 rotatably about a tilting rotation axis T. The panning rotation hinge 402 is attached to the fixed unit 30 rotatably about a panning rotation axis P. The tilting rotation axis T and the panning rotation axis P are substantially perpendicular to each other. Accordingly, postures of the movable unit 20 and the lens unit 50 are able to be changed to various postures with respect to the fixed unit 30 by appropriately operating the tilting rotation hinge 401 and the panning rotation hinge 402.

The hinge unit 40 has a certain amount of holding force in a state in which the tilting rotation hinge 401 and the panning rotation hinge 402 are stopped. The certain amount of holding force is set to be higher than a static torque which maintains a stopped posture of the hinge unit 40 in a state in which the hinge unit 40 receives weights of the lens unit 50 and the movable unit 20. Therefore, when a user directs the lens unit 50 to a subject by rotating the movable unit 20 to which the lens unit 50 is mounted and then stops a rotating operation, the lens unit 50 and the movable unit 20 are able to maintain their postures at a time of stopping the rotating operation unchanged.

A display unit 303 which includes a Liquid Crystal Display, an organic EL display, or the like is arranged on the fixed unit 30 in a pivotable manner within a certain angle range about a pivotal axis A by a display unit hinge 306 (see FIG. 15). A display such as a video during shooting, a shot image or a shot video, and a menu screen to set a shooting condition are displayed on the display screen 303a of the display unit 303. It should be noted that a touch panel may be superposed on the display screen 303a, and in this case, the display unit 303 may be used as an operating means.

The fixed unit 30 includes a holding part 304. The holding part 304 is formed on an end of the fixed unit 30, and a surface of the holding part 304 is comprised of a material having an elasticity such as an ethylene propylene diene rubber (EPDM) and a silicon rubber. The user freely performs the rotational operation of the lens unit 50 and the movable unit 20 with one hand while holding the holding part 304 in another hand. As a result, shootings from various angles are enabled.

An operation unit 301 is arranged in the fixed unit 30 at a position where the user is able to operate it with holding the holding part 304. The operation unit 301 includes a first button 301a, a second button 301b, and a touch pad 301c. The user performs a selecting operation by the touch pad 301c and performs a determining operation by the first button 301a and the second button 301b.

The movable unit 20 includes an accessary shoe 209. The accessary shoe 209 is a part to attach an external device (accessary) to the image pickup apparatus 10. For example, the external device such as a video light and an external microphone is attached to the accessory shoe 209.

It should be noted that as shown in FIGS. 1A and 1B, an X direction, a Y direction, and a Z direction with respect to the image pickup apparatus 10 on a basis of the fixed unit 30 are defined, for the convenience of explanation. A direction parallel to the panning rotation axis P is defined as the Y direction. The Y direction does not necessarily match a direction of gravity. It should be noted that as to the Y direction, a direction from the fixed unit 30 towards the movable unit 20 is defined as a +Y direction, and a direction from the movable unit 20 towards the fixed unit 30 is defined as a −Y direction. Moreover, in a state in which the display screen 303a of the display unit 303 is parallel to the Y direction, a direction perpendicular to the display screen 303a is defined as a −Z direction. In the same state, a direction in which the display screen 303a faces is defined as a −Z direction, a direction opposite to the −Z direction is defined as a +Z direction. A direction perpendicular to the Z direction and the Y direction is defined as the X direction. The X direction is parallel to the pivotal axis A.

Figure 2:
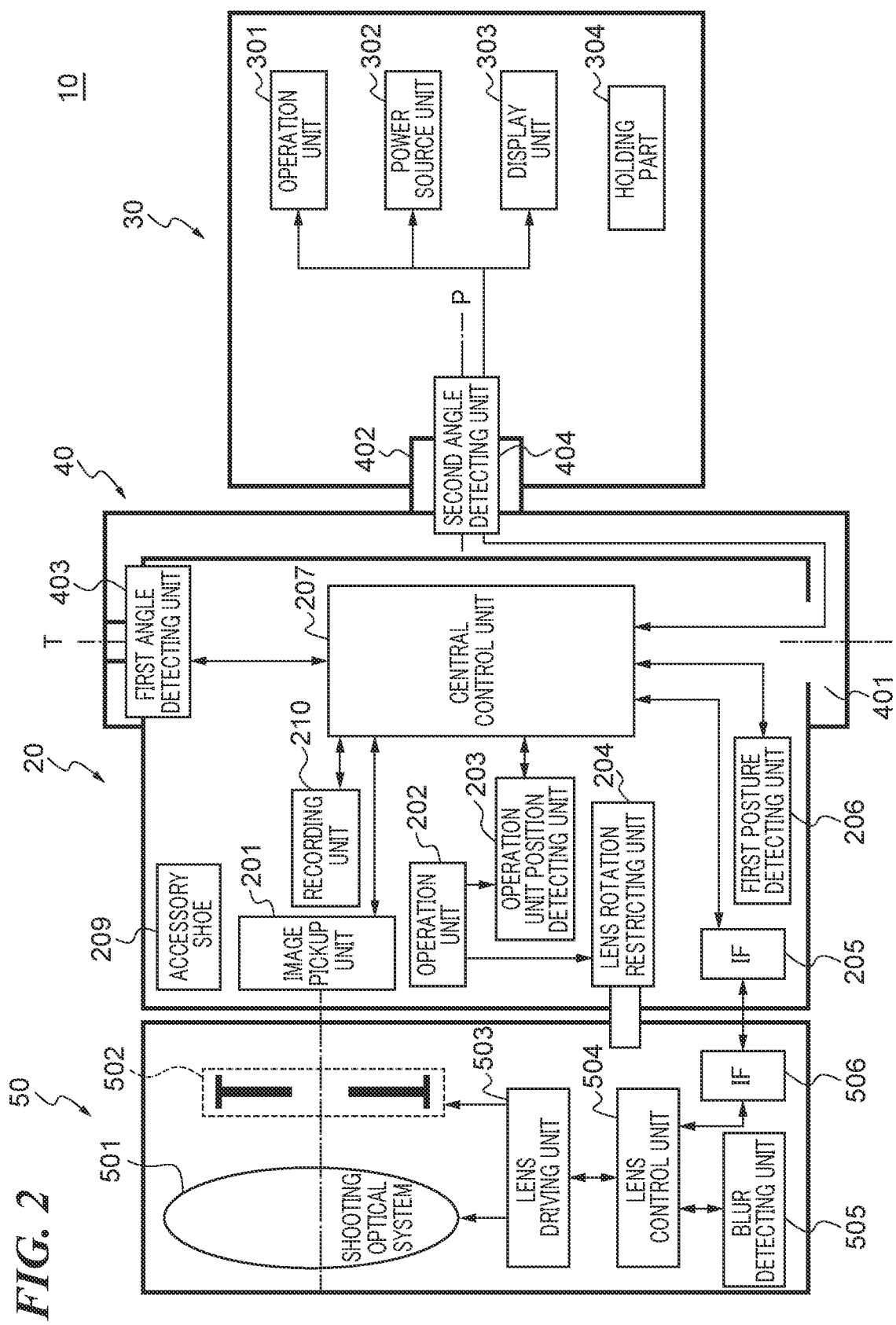
FIG. 2 is a block diagram showing the image pickup apparatus according to the first embodiment.

FIG. 2 is a block diagram of the image pickup apparatus 10. The lens unit 50 includes a shooting optical system 501, an aperture unit 502, a lens driving unit 503, a lens control unit 504, a blur detecting unit 505, and the interface unit 506. The movable unit 20 includes an image pickup unit 201 (image pickup device), the operation unit 202, an operation unit position detecting unit 203, the lens rotation restricting unit 204, the interface unit 205, a first posture detecting unit 206a, a central control unit 207, the accessory shoe 209, and a recording unit 210. The hinge unit 40 includes a first angle detecting unit 403 and a second angle detecting unit 404. The fixed unit 30 includes the operation unit 301, a power source unit 302, the display unit 303, and the holding part 304.

In the lens unit 50, the shooting optical system 501 includes a plurality of lenses, a holder (holding member) to hold the plurality of lenses, a zoom lens mechanism, a focus lens mechanism, a blur correction lens mechanism, and so on. As the aperture unit 502, an iris aperture unit which, for example, drives a plurality of thin shading sheets to change a size of an opening formed with an optical axis at its center is used. The lens driving unit 503 includes various types of actuators to drive the zoom lens mechanism, the focus lens mechanism, the blur correction lens mechanism, the aperture unit 502, and so on. The various types of actuators are selected by considering a driving force and a speed required to drive a driving object, a stroke, a stopping accuracy, a power consumption, a manufacturing cost, and so on, and for example, a DC motor, a stepping motor, a vibrating type driving device (Ultrasonic Motor (USM)), or the like is used.

The lens control unit 504 includes a motor driver IC and controls operations of various types of actuators of the lens driving unit 503. The lens control unit 504 and the central control unit 207 are able to communicate with each other through an electric connection between the interface unit 506 of the lens unit 50 and the interface unit 205 of the movable unit 20.

The blur detecting unit 505 is comprised of a gyro sensor, an acceleration sensor, and the like, and detects a blur of the lens unit 50 (image pickup apparatus 10). A blur detection signal output from the blur detecting unit 505 is transmitted to the lens control unit 504, and further transmitted, as an analog signal or a digital data, from the lens control unit 504 to the central control unit 207 via the interface units 506 and 205. The central control unit 207 detects a motion and a handshake of the lens unit 50 at a time of performing a panning shooting based on information from the blur detecting unit 505.

In the movable unit 20, the image pickup unit 201 includes a photoelectric conversion element such as a CCD sensor, a CMOS sensor, and the like, and a low-pass filter, for example. The low-pass filter is comprised of, for example, a crystal and prevents an incident of an infrared light by its surface subjected to an infrared light shielding process as well as an occurrence of a color moire or the like.

The central control unit 207 includes a CPU (Central Processing Unit) to control an overall operation of the image pickup apparatus 10. An electrical signal input from the image pickup unit 201 to the central control unit 207 is converted into a video signal by the central control unit 207 and then appropriately processed into an arbitral image data. The processing of the video signal includes an image cut out and an electronic image stabilizing operation due to rotation processing. The recording unit 210 records not only an image data captured by shooting but a day and time of the shooting and a setting condition and the like of the image pickup apparatus 10 at a time of the shooting.

The operation unit 202 is a member which is operated by the user when the user removes the lens unit 50 from the movable unit 20, and is able to transit to a plurality of positions. The operation unit position detecting unit 203 is comprised of a transmissive photo interrupter which changes an output signal according to an amount of received light, for example, and detects a position of the operation unit 202 from the output signal. A detection result by the operation unit position detecting unit 203 is input to the central control unit 207.

The lens rotation restricting unit 204 is operated by the operation unit 202. The movable pin 204b of the lens rotation restricting unit 204 is able to move in a reciprocating manner between a protruding position of protruding from a surface of the lens mount 211 to restrict the rotation of the lens unit 50 and a retracting position of retracting from the surface of the lens mount 211 to allow the rotation of the lens unit 50.

The first posture detecting unit 206 includes a gyro sensor, an acceleration sensor, and the like, and for example, is used to detect an absolute posture (an inclination of the movable unit 20 with respect to the vertical direction) of the movable unit 20 (the image pickup unit 201). The first angle detecting unit 403 is comprised of an acceleration sensor, an angle sensor, and the like, and is used to detect a rotation angle of the tilting rotation hinge 401. The second angle detecting unit 404 is comprised of the acceleration sensor, the angle sensor, and the like, and is used to detect a rotation angle of the panning rotation hinge 402. Each of detection signals output from the first posture detecting unit 206, the first angle detecting unit 403, and the second angle detecting unit 404 is transmitted as an analog signal or a digital data to the central control unit 207. The central control unit 207 determines first to seventh directions, to be described later, defined as to the posture of the image pickup apparatus 10 based on each of the detection signals from the first posture detecting unit 206, the first angle detecting unit 403, and the second angle detecting unit 404.

In the fixed unit 30, the power source unit 302 includes a battery pack with, for example, an alkaline secondary battery, a lithium ion secondary battery, and so on. The power source unit 302 is electrically connected to the central control unit 207 via, for example, a wire harness wired inside of the hinge unit 40 and supplies a power to parts of the image pickup apparatus 10. It should be noted that the operation unit 301, the display unit 303, and the holding part 304 have already been explained by referring to FIGS. 1A and 1B, and hence the explanations thereof are omitted here.

Figure 3:
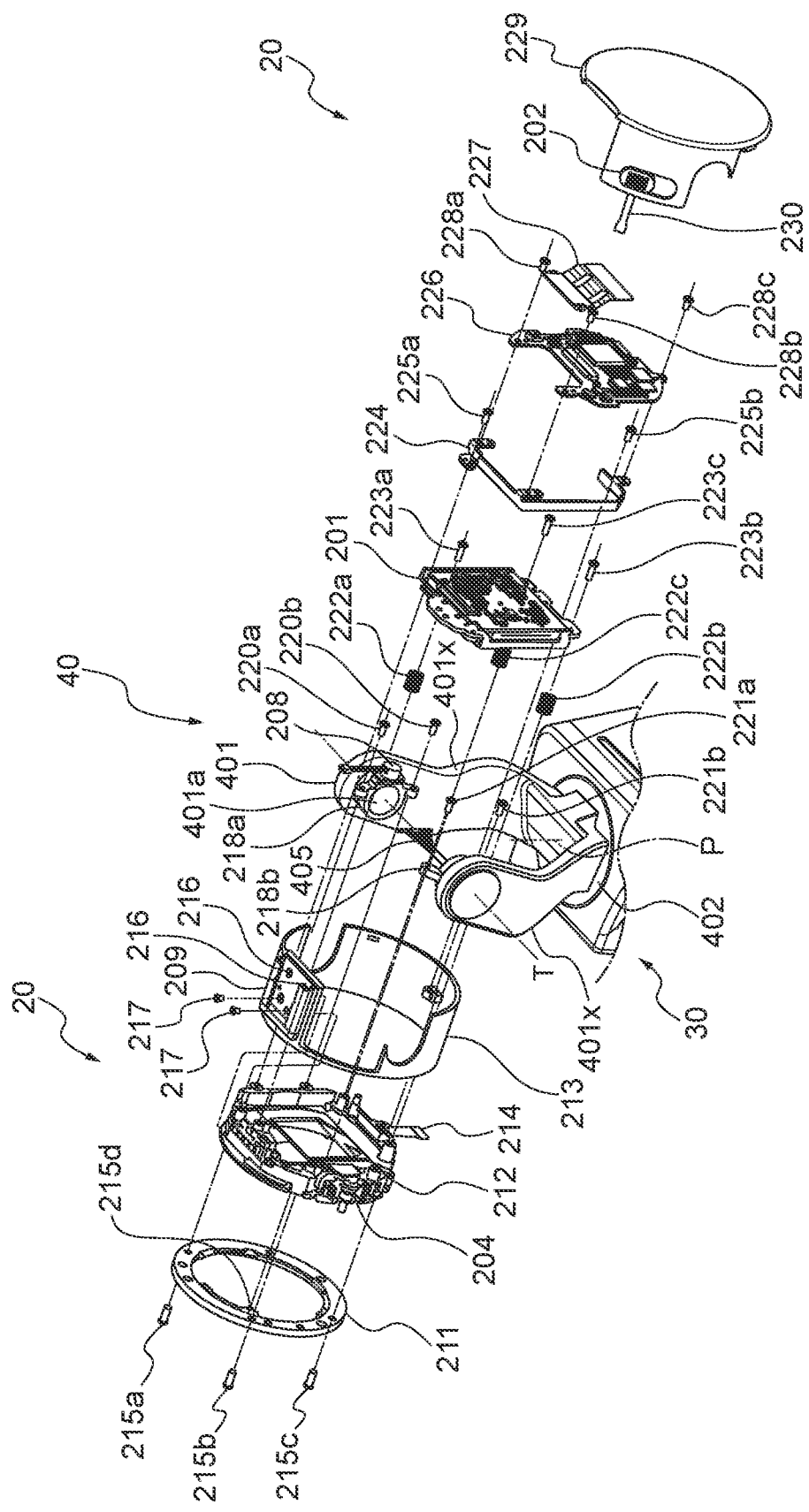
FIG. 3 is an exploded perspective view of a movable unit of the image pickup apparatus according to the first embodiment.

Next, a description will be given of the inner structure of the movable unit 20 including a bonding structure with respect to the hinge unit 40. FIG. 3 is an exploded perspective view of the movable unit 20. The lens mount 211 is fixed to a base member 212 by screws 215a, 215b, 215c, and 215d. The base member 212 is a metal part which is die-cast molded (casted) with a magnesium alloy, an aluminum alloy, or the like. Moreover, the base member 212 includes the lens rotation restricting unit 204 and the interface unit 205 (see FIG. 2). The interface unit 205 includes a plurality of contact pins, an urging member such as a coil spring, and a resin case which accommodates these members, although a detail of the interface unit 205 is not shown in the figure. The plurality of contact pins protrudes from an opening of the resin case. The contact pins are constantly urged from a back side by the urging member, and are able to slidingly move from a surface side of the resin case to inside of the same.

A flexible printed board 214 is connected to the interface unit 205. By pressing the contact pins of the interface unit 205 into the inside from the surface of the resin case by a certain amount, the contact pins and a conductive trance provided on the flexible printed board 214 become electrically conductive with each other.

A side face cover 213 is provided to surround a circumference of the base member 212. The accessory shoe 209 is fixed to the side face cover 213 by two screws 216. The side face cover 213 is fixed to the base member 212 by two screws 217 being fastened to the base member 212 from screw holes formed in the accessory shoe 209 via clearance holes formed in the side face cover 213.

The image pickup unit 201 is fixed to the base member 212 by screws 223a, 223b, and 223c. The image pickup unit 201 includes a photoelectric conversion element, a low-pass filter, a hard package electrically connected to the photoelectric conversion element, a printed board on which the hard package is mounted, various electronic parts mounted on the printed board, a metal plate adhesively fixed to the hard package, and so on. A ceramic-based multilayer board is used as the hard package, for example, and a conductor pattern is formed inside the hard package. A part of the conductor pattern is connected to an electrode terminal which exposes on a surface of the hard package, and a part of the electrode terminal and the photoelectric conversion element are electrically connected with each other in a manner such as a wire bonding. The electrode terminal of the hard package is mounted on the printed board with the various electronic parts by, for example, a reflow soldering. By aligning the hard package with respect to the metal plate, and then fixing a side face of the hard package and an end face of the metal plate by adhesives such as an ultraviolet curing resin, the hard package is fixed to the metal plate.

By attaching the metal plate to the base member 212 by screws 223a, 223b, and 223c, the image pickup unit 201 is attached to the base member 212. In this case, the image pickup unit 201 and the base member 212 are combined with sandwiching coil springs 222a, 222b, and 222c therebetween. Accordingly, since the image pickup unit 201 is supported so that the image pickup unit 201 is able to displace by a certain amount with respect to the base member 212 in a direction of the optical axis, an inclination of an image pickup surface of the image pickup unit 201 with respect to the base member 212 can be adjusted by adjusting an amount of fastening of the screws 223a, 223b, and 223c. After completing an adjustment of the inclination, the screws 223a, 223b, and 223c are adhesively fixed to the metal plate so as not to loosen the screws 223a, 223b, and 223c.

As described above, the hinge unit 40 includes by the tilting rotation hinge 401 and the panning rotation hinge 402. The tilting rotation hinge 401 includes a forked piece 401x which extend in a forked shape. On each ends of the forked piece 401x, arm portions 401a and 401b (the reference numeral 401b is not shown in the figure) are provided facing each other. A holder 218a is held by the arm portion 401a rotatably about the tilting rotation axis T with respect to the arm portion 401a. A holder 218b is held by the arm portion 401b rotatably about the tilting rotation axis T with respect to the arm portion 401b.

An inside of the arm portion 401b which holds the holder 218b is a hollow structure, and a harness 405 is inserted into the arm portion 401b and wired inside of the panning rotation hinge 402. The harness 405 is further wired from the inside of the panning rotation hinge 402 to the inside of the fixed unit 30, and electrically connected to the operation unit 301, the power source unit 302, the display unit 303, and so on. Screw fastening holes are formed in each of the holders 218a and 281b, the holder 218a is fixed to the base member 212 by screws 220a and 220b, and the holder 218b is fixed to the base member 212 by screws 221a and 221b.

The movable unit 20 includes a chassis 224 in which a plurality of screw fastening holes is formed, and the chassis 224 is fixed to the side face cover 213 by screws 225a and 225b. A printed board 226 is fixed to the chassis 224 by fastening of screws 228a, 228b, and 228c. On the printed board 226, various electronic components including the first posture detecting unit 206, the central control unit 207, the recording unit 210, and so on are mounted by reflow soldering, for example. A plurality of connectors is further mounted on the printed board 226, and the flexible printed board 214 and the harness 405 are electrically connected to the connectors. The image pickup unit 201 and the printed board 226 are electrically connected by connecting one end of the flexible printed board 227 to the printed board 226 and connecting the another end of the flexible printed board 227 to a printed board of the image pickup unit 201.

The operation unit 202 is provided on a rear cover 229. A flexible printed board 230 extending from the operation unit 202 is connected to the connectors mounted on the printed board 226. Engaging claws to engage with the side face cover 213 are formed at a plurality of locations on the rear cover 229, and groove portions are formed on the side face cover 213 at locations to corresponds to the engaging claws of the rear cover 229. When the rear cover 229 is attached to the side face cover 213 by engaging the engaging claws with the groove portions, the engaging claws hook to the groove portions and act as drop-off preventing parts. It should be noted that dropping-off of the covers may be prevented more reliably by fixing the side face cover 213 and the rear cover 229 by adhesives.

Subsequently, a relative positional relationship between the movable unit 20 and the fixed unit 30, and the first posture detecting unit 206, the first angle detecting unit 403, and the second angle detecting unit 404 will be described in detail.

Figure 4:
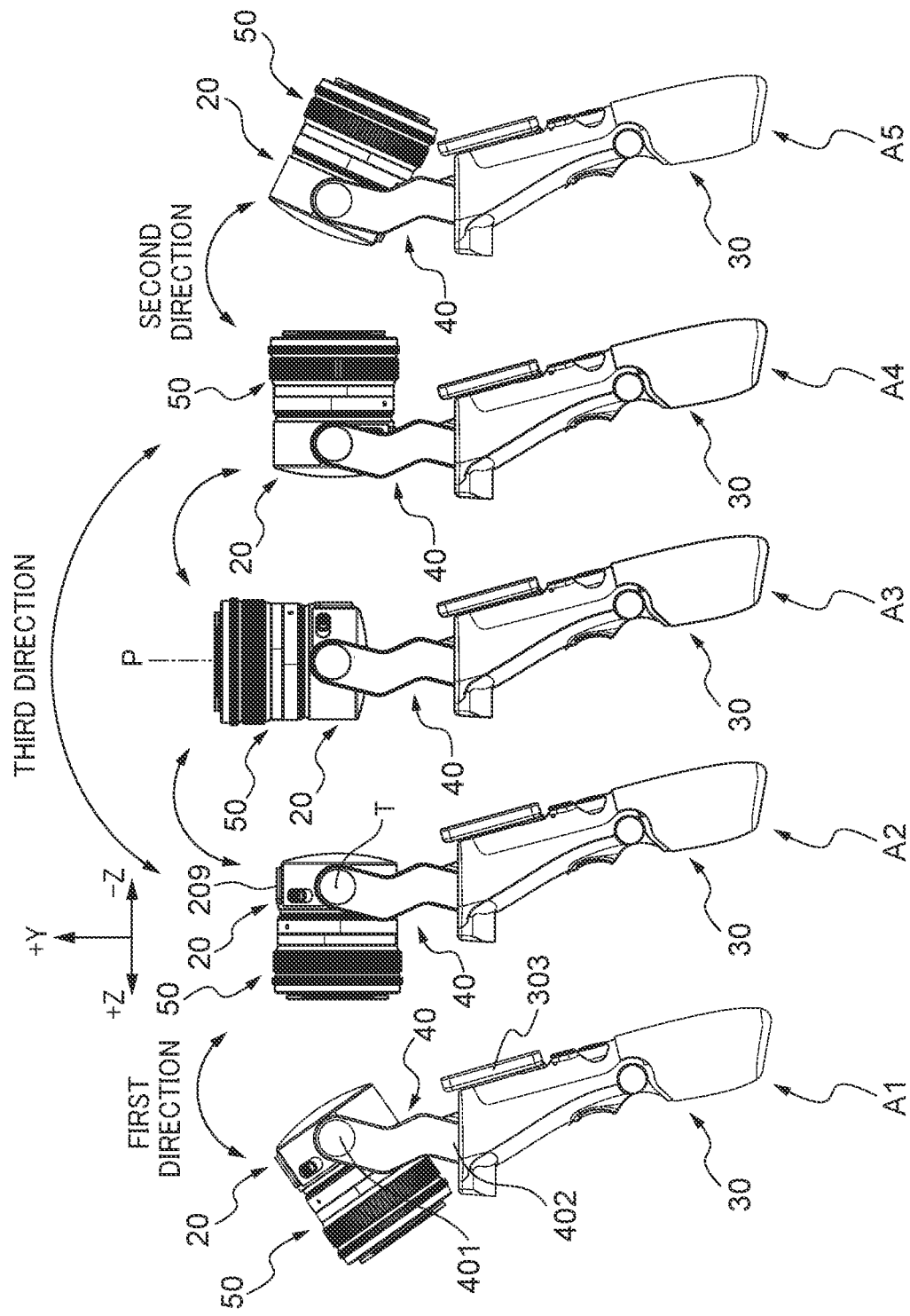
FIG. 4 is a view showing an example of states in a tilting rotation of the movable unit of the image pickup apparatus in the first embodiment.
Figure 5:
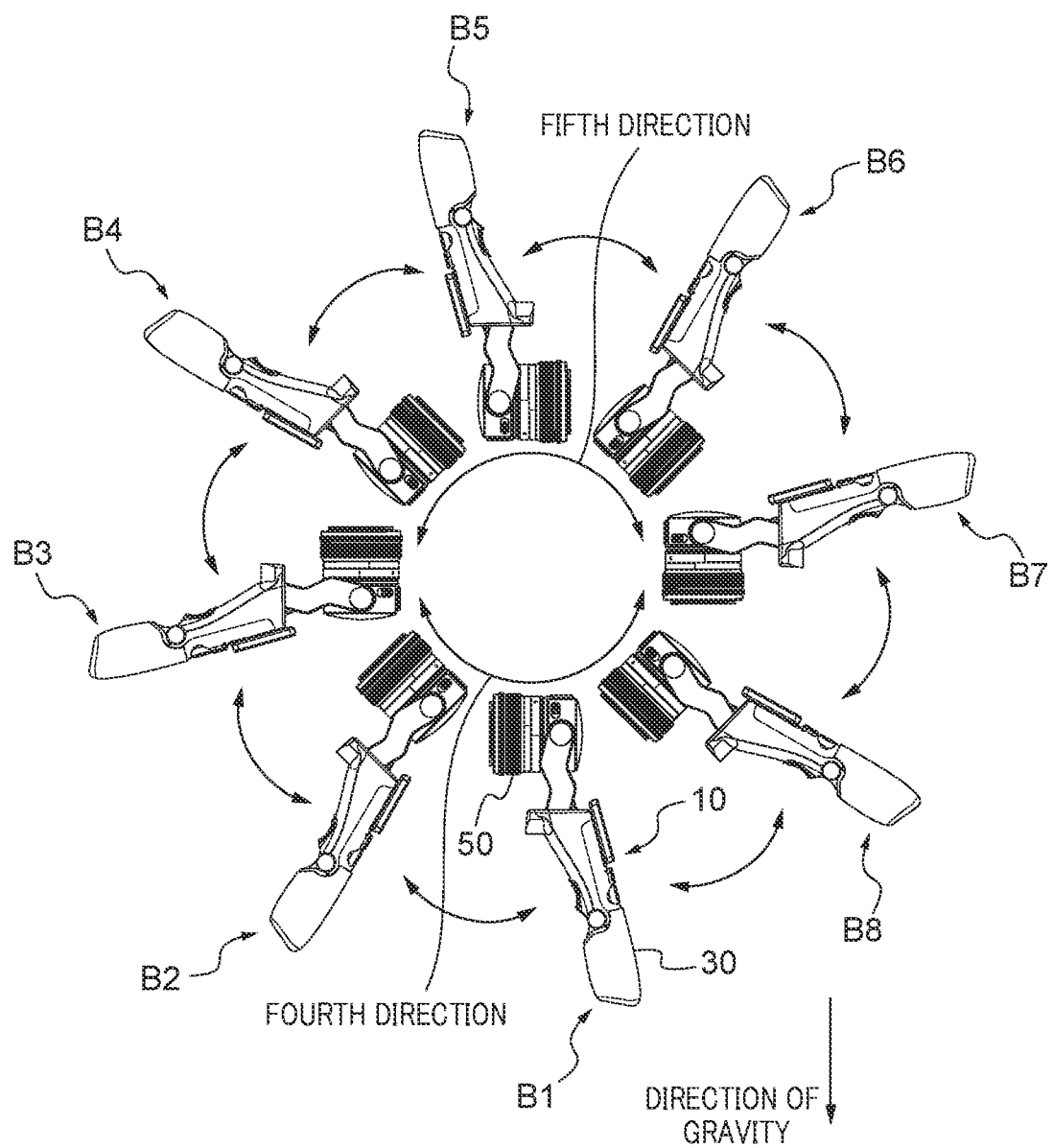
FIG. 5 is a view showing an example of states in which the entire image pickup apparatus is rotated in a plane including a vertical direction in the first embodiment.
Figure 6:
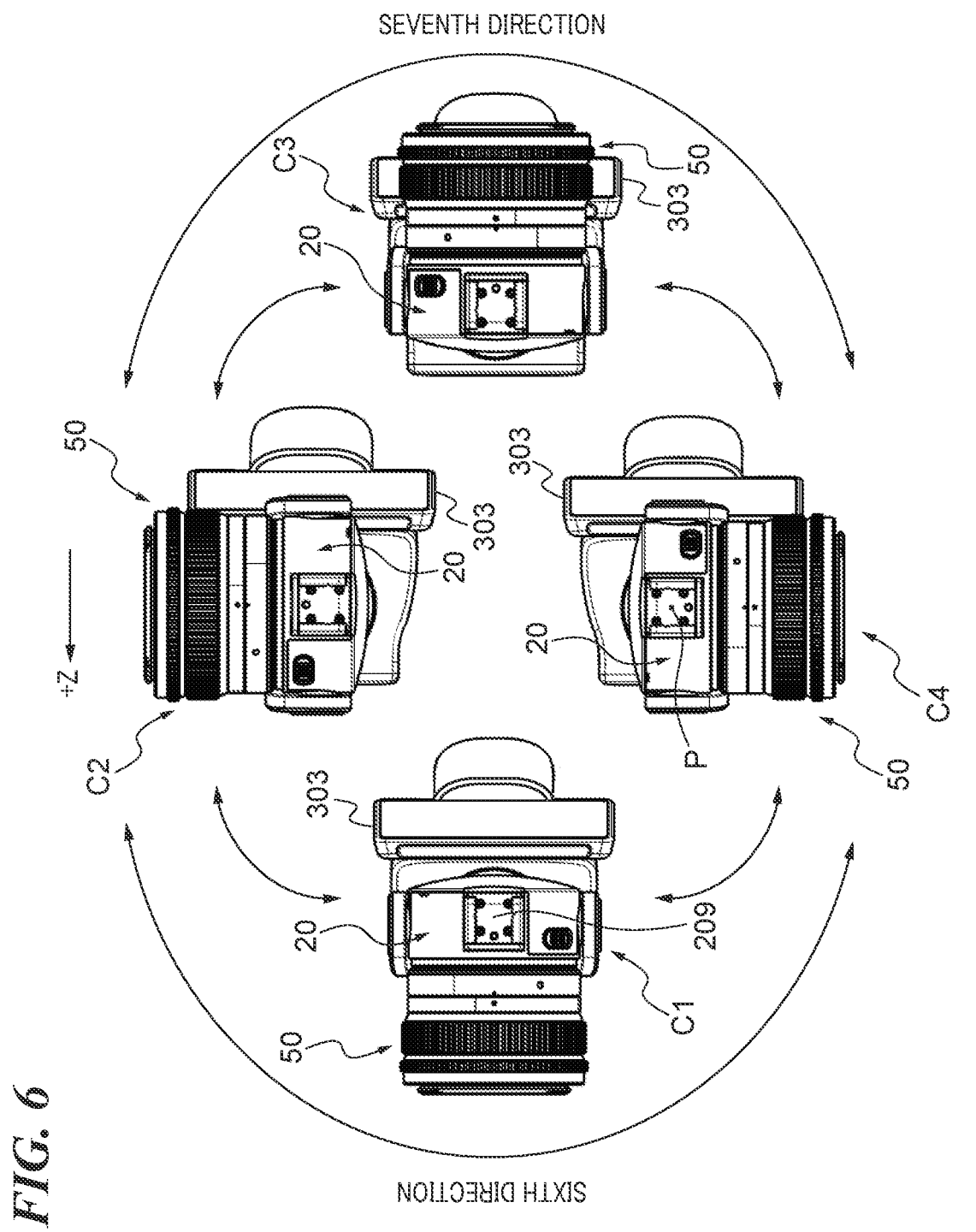
FIG. 6 is a view showing an example of states in a panning rotation of the movable unit of the image pickup apparatus in the first embodiment.

FIG. 4 is a view showing states A1 to A5 of the movable unit 20 rotated about the tilting rotation axis T. FIG. 5 is a view showing states B1 to B8 of the entire image pickup apparatus 10 rotated in a plane including the vertical direction. FIG. 6 is a view showing states C1 to C4 of the movable unit 20 rotated about the panning rotation axis P.

As described above, the X direction, the Y direction, and the Z direction are defied with respect to the image pickup apparatus 10 as shown in FIGS. 1A and 1B. According to the defined directions, a state in which the lens unit 50 faces the +Z direction is defined as a "forward state", and a state in which the lens unit 50 faces the −Z direction is defined as a "backward state". Moreover, a posture in which the accessory shoe 209 of the movable unit 20 faces the +Y direction (an opposite side to the fixed unit 30 is defined as a "normal posture", and a posture in which the accessory shoe 209 faces the −Y direction (the same side as the fixed unit 30 is arranged) is defined as a "reverse posture".

For example, the states A2, B1, and C1 are in the same posture and correspond to the forward state and the normal posture. The state A4 corresponds to the backward state and the reverse posture. The states B1 to B8 and C1 to C4 correspond to the normal posture. The shooting direction in the states A2, B1 to B8, and C1 is the +Z direction, and the shooting direction in the states A4 and C3 is the −Z direction. In the normal posture, the image pickup unit 201 generates an image the vertical direction of which is the same as that of a subject, and in the reverse posture, the image pickup unit 201 generates an image the vertical direction of which is opposite to that of the subject. It should be noted that the image pickup apparatus 10 may be configured to have a click feeling for an operation in each state and each posture so as not to easily change its state and posture. For example, the image pickup apparatus 10 may be configured so that transition from the states A2, A3, A4, C1, C2, C3, and C4 is more difficult than that from other states.

Directions defined with respect to the rotation of the movable unit 20 about the tilting rotation axis T will be described by referring to the states A1 to A5 shown in FIG. 4. It should be noted that in the states A1 to A5, the movable unit 20 does not rotate about the panning rotation axis P. A rotation range (within a rotation phase between the states A1 and A2) from the forward direction (the +Z direction) to the −Y direction (a direction facing the fixed unit 30) with reference to the forward direction is defined as a "first direction". Similarly, a rotation range (within a rotation phase between the states A4 and A5) from the backward direction (the −Z direction) to the −Y direction with reference to the backward direction is defined as a "second direction". Moreover, a rotation range (within a rotation phase between the states A2 to A3 to A4) toward the +Y direction between the forward direction and the backward direction is defined as a "third direction". The rotation angle in the third direction is 180°. Accordingly, the movable unit 20 is able to rotate more than 1800 about the tilting rotation axis T. It should be noted that the state A4 corresponds to a posture frequently used to perform self-shooting to take the photographer oneself being as a subject.

Directions defined with respect to the absolute posture of the movable unit 20 will be described by referring to the states B1 to B8 shown in FIG. 5. It should be noted that as to the states B2 to B8 in FIG. 5, reference numerals for the image pickup apparatus 10 are omitted. In the state B1, the −Y direction corresponds to the direction of gravity in the normal posture, and in the state B5, the +Y direction corresponds to the direction of gravity in the normal posture. A rotation range of ±90° from the state B1 (between the states B3 to B2 to B1 to B8 to B7) through which the entire image pickup apparatus 10 rotates about an axis parallel to the tilting rotation axis T (not shown in FIG. 5) is defined as a "fourth direction". Moreover, a rotation range of ±90° from the state B5 (between the states B3 to B4 to B5 to B6 to B7) through which the entire image pickup apparatus 10 rotates about the axis parallel to the tilting rotation axis T is defined as a "fifth direction".

Directions defined with respect to the rotation of the movable unit 20 about the panning rotation axis P will be described by referring to the states C1 to C4 shown in FIG. 6. A rotational range ±90° with reference to the forward direction (the +Z direction) (between the states C4 to C1 to C2) is defined as a "sixth direction". Moreover, with respect to the rotation of the movable unit 20 about the panning rotation axis P, a rotational range of ±90° with reference to the backward direction (the −Z direction) (between the states C2 to C3 to C4) is defined as a "seventh direction".

As described above, the detection signals from the first posture detecting unit 206, the first angle detecting unit 403, and the second angle detecting unit 404 are transmitted to the central control unit 207. The central control unit 207 performs a determination as to the first to fifth directions based on the detection signals from the first posture detecting unit 206 and the first angle detecting unit 403. Moreover, the central control unit 207 performs a determination as to the sixth or seventh direction based on the detection signal from the second angle detecting unit 404. According to the determined directions, the central control unit 207 performs a display switching control on the display screen 303a of the display unit 303.

The display of the display screen 303a can be switched into a vertically inverted display (Y direction inverted display), a laterally inverted display (X direction inverted display), and a vertically and laterally inverted display with reference to the forward state and the normal posture. It should be noted that as shown in FIGS. 1A and 1B, in the present embodiment, the display screen 303a has a rectangular shape in which a long side thereof is parallel to the pivotal axis A and a short side is perpendicular to the pivotal axis A. A lateral direction of the display screen 303a is parallel to the long side, and a vertical direction of the display screen 303a is parallel to the short side.

FIGS. 7A and 7B are diagrams useful in explaining contents of a display switching of the display screen 303a of the image pickup apparatus 10. FIG. 7A is a diagram useful in explaining how to switch the display of the display screen 303a in the vertical direction. FIG. 7B is a diagram useful in explaining how to switch the display of the display screen 303a in the lateral direction.

The display switching on the display screen 303a in the vertical direction is controlled according to determination results as to the first to third directions and the fourth and fifth directions with reference to the forward direction and the normal posture. Specifically, when the determination result is the first direction, the vertical inversion of the display is not performed regardless of whether another determination result is the fourth or the fifth direction. When the determination result is the second direction, the vertical inversion of the display is performed regardless of whether the another determination result is the fourth or the fifth direction. When the determination results are the third and fourth directions, the vertical inversion of the display is not performed. On the other hand, the determination results are the third and fifth directions, the vertical inversion of the display is performed.

The display switching on the display screen 303a in the lateral direction is controlled according to a determination result as to the sixth and seventh directions with reference to the forward direction and the normal posture. When the determination result is the sixth direction, the lateral inversion of the display is not performed. On the other hand, when the determination result is the seventh direction, the lateral inversion of the display is performed. As a result of such a display switching control, it is possible to display an image following an intention of the photographer in a case of the self-portrait shooting or others-portrait shooting.

Figure 8A:
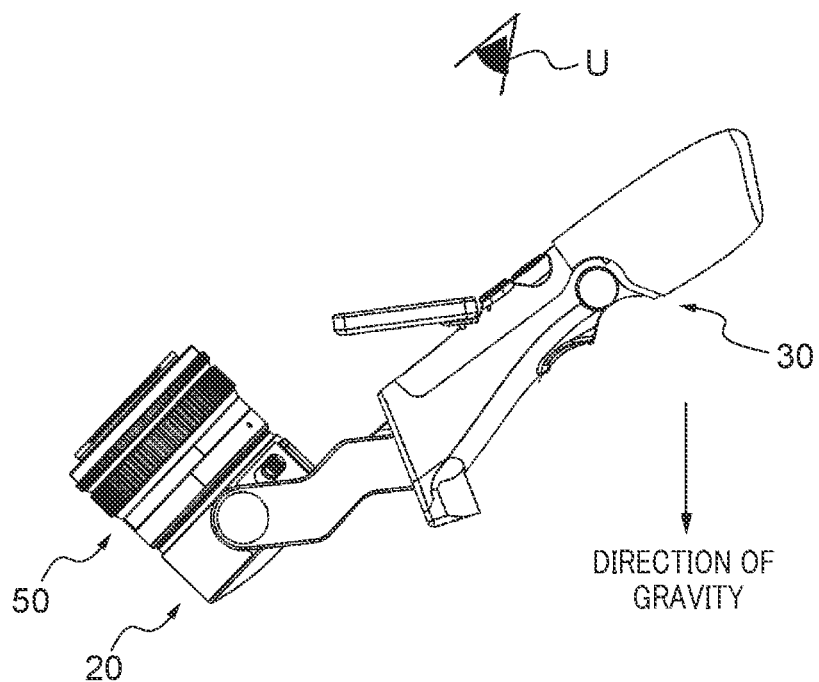
FIGS. 8A and 8B are views showing examples of a posture of the image pickup apparatus and an eye of the photographer in the first embodiment.
Figure 8B:
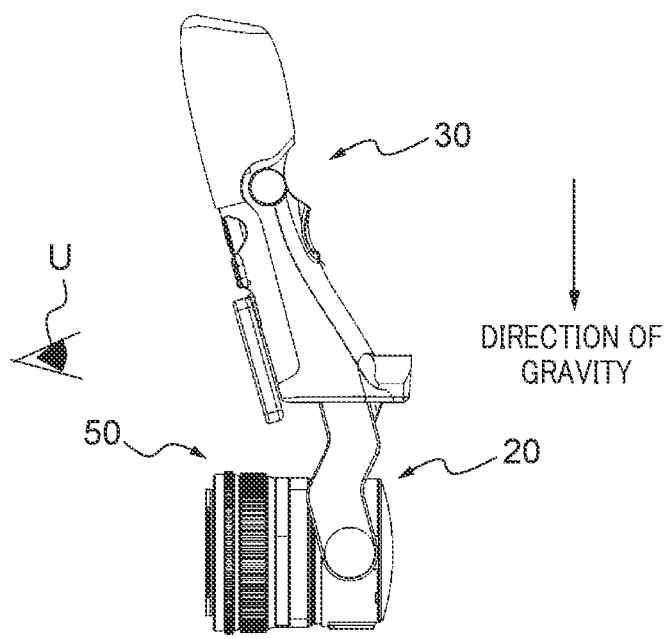

FIGS. 8A and 8B are views showing examples of a positional relationship between the posture of the image pickup apparatus 10 and an eye U of the photographer. FIG. 8A shows a positional relationship between the image pickup apparatus 10 and the eye U of the photographer at a time of a low angle shooting. This case corresponds to the third direction, the fourth direction, and the sixth direction, and accordingly, the display of the display screen 303a is a normal display without the vertical and lateral inversions. FIG. 8B shows a positional relationship between the image pickup apparatus 10 and the eye U of the photographer when the shooting is performed in a state where the image pickup apparatus 10 is hanged from a tree branch or the like. This case corresponds to the first direction, the fifth direction, and the seventh direction, and accordingly, the display of the display screen 303a is laterally inverted without the vertical inversion.

In this manner, even when the posture of the image pickup apparatus 10 is changed by changing the angle of the movable unit 20 with respect to the fixed unit 30, the rotation angle of the hinge unit 40, a way to hold the image pickup apparatus 10 (the fixed unit 30), and so on, an appropriate display image is constantly provided to the photographer. As a result, the photographer is able to easily check whether the shooting following a photographer's intent is possible or whether the shooting following the photographer's intent is underway through a video (an image) displayed on the display unit 303 even when the posture of the image pickup apparatus 10 is changed in a various manner.

Figure 9:
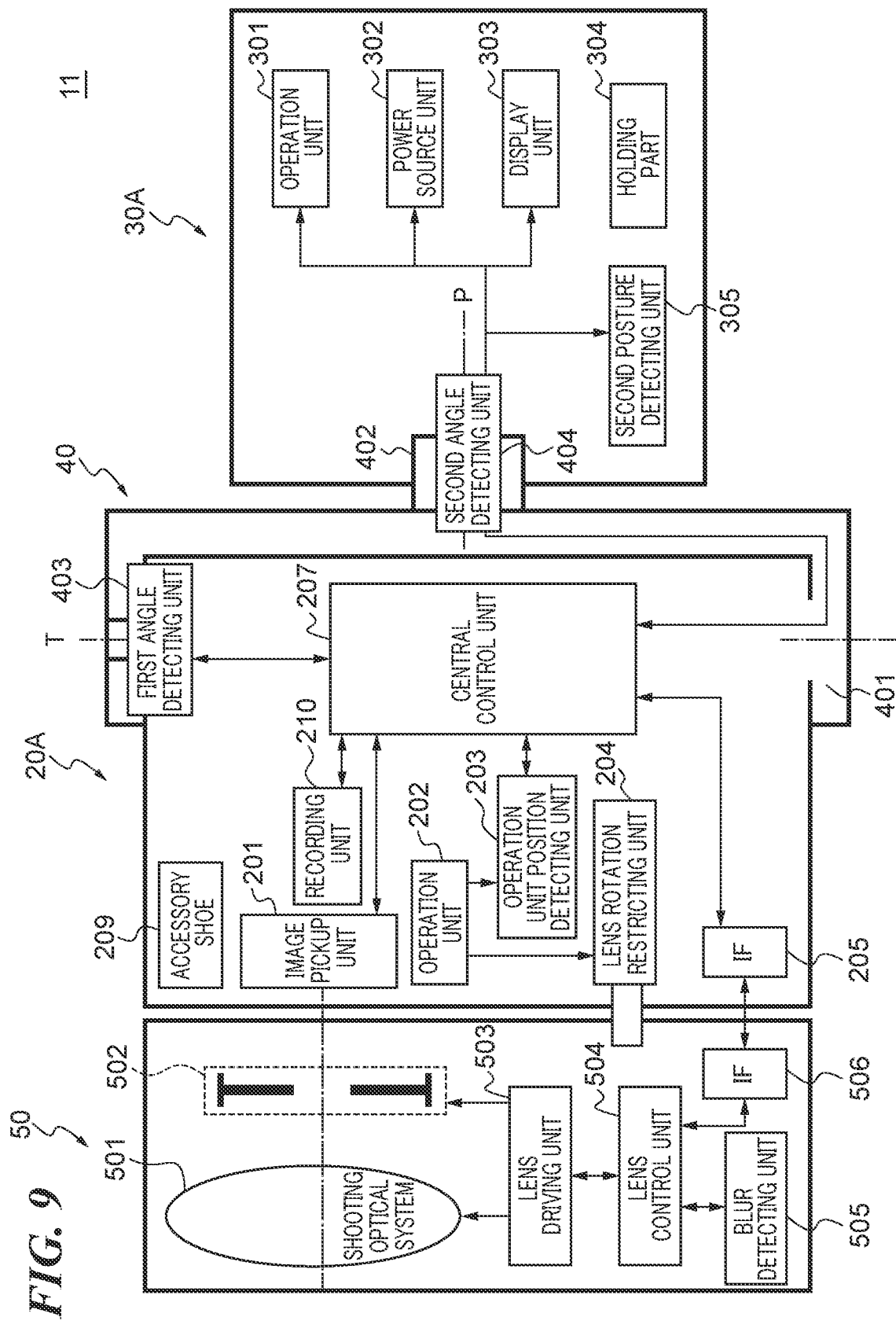
FIG. 9 is a block diagram of an image pickup apparatus according to a second embodiment.

Next, a description will be given of a second embodiment of the present invention. FIG. 9 is a block diagram of an image pickup apparatus 11 according to the second embodiment. Compared to the image pickup apparatus 10 according to the first embodiment, the image pickup apparatus 11 differs in including a fixed unit 30A to which a second posture detecting unit 305 is mounted and a movable unit 20A which does not include the first posture detecting unit 206. For this reason, among component elements of the image pickup apparatus 11, component elements same as those of the image pickup apparatus 10 are indicated by the same reference numerals in FIG. 9, and thus the explanations thereof are omitted here. Since an appearance of the image pickup apparatus 11 is the same as that of the image pickup apparatus 10 (see FIGS. 1A and 1B), the explanation thereof is omitted here.

The second posture detecting unit 305 is comprised of a gyro sensor, an acceleration sensor, and the like, and detects an absolute posture of the fixed unit 30A in the states B1 to B8 shown in FIG. 5. A rotation range of ±90° from the state B1 (between the states B3 to B2 to B1 to B8 to B7) through which the entire image pickup apparatus 11 rotates about the axis parallel to the tilting rotation axis T (not shown in FIG. 5) is defined as a "eighth direction". Moreover, a rotation range of ±90° from the state B5 (between the states B3 to B4 to B5 to B6 to B7) through which the entire image pickup apparatus 11 rotates about the axis parallel to the tilting rotation axis T is defined as a "ninth direction".

A detection signal output from the second posture detecting unit 305 is transmitted to the central control unit 207 as an analog signal or a digital data. The central control unit 207 determines the posture of the image pickup apparatus 11 based on each of the detection signals from the first angle detecting unit 403 and the second posture detecting unit 305 and performs the display switching control on the display screen 303a of the display unit 30 based on a determination result.

It should be noted that since the display switching control on the display screen 303a of the image pickup apparatus 11 in the lateral direction is performed in the same manner as the display switching control on the display screen 303a of the image pickup apparatus 10 in the lateral direction, an explanation thereof is omitted here. The image pickup apparatus 11 may be configured so that the image pickup apparatus 11 does not include the second angle detecting unit 404 and does not perform the lateral inversion of the display.

FIG. 10 is a diagram useful in explaining contents of a display switching of the display screen 303a of the image pickup apparatus 11. The display switching of the display screen 303a in the vertical direction is controlled according to a determination result as to the first to third directions and a determination result as to the eighth and ninth direction with reference to the forward direction and the normal posture. It should be noted that the definitions of the "forward direction", the "backward direction", the "normal posture", and the "reverse posture" in the second embodiment conform to the definitions in the first embodiment.

Specifically, when the determination result is the first direction, the vertical inversion of the display is not performed regardless of whether another determination result is the eighth direction or the ninth direction. When the determination result is the second direction, the vertical inversion of the display is performed regardless of whether the another determination result is the eighth direction or the ninth direction. When the determination results are the third and eighth directions, the vertical inversion of the display is not performed. On the other hand, the determination results are the third and ninth directions, the vertical inversion of the display is performed.

As described above, in the image pickup apparatus 11 according to the second embodiment as well, an appropriate display image is constantly provided to the photographer according to the posture of the image pickup apparatus 11. As a result, the photographer is able to easily check whether the shooting following a photographer's intent is possible or whether the shooting following the photographer's intent is underway through a video (an image) displayed on the display unit 303 even when the posture of the image pickup apparatus 11 is changed in a various manner.

Figure 11:
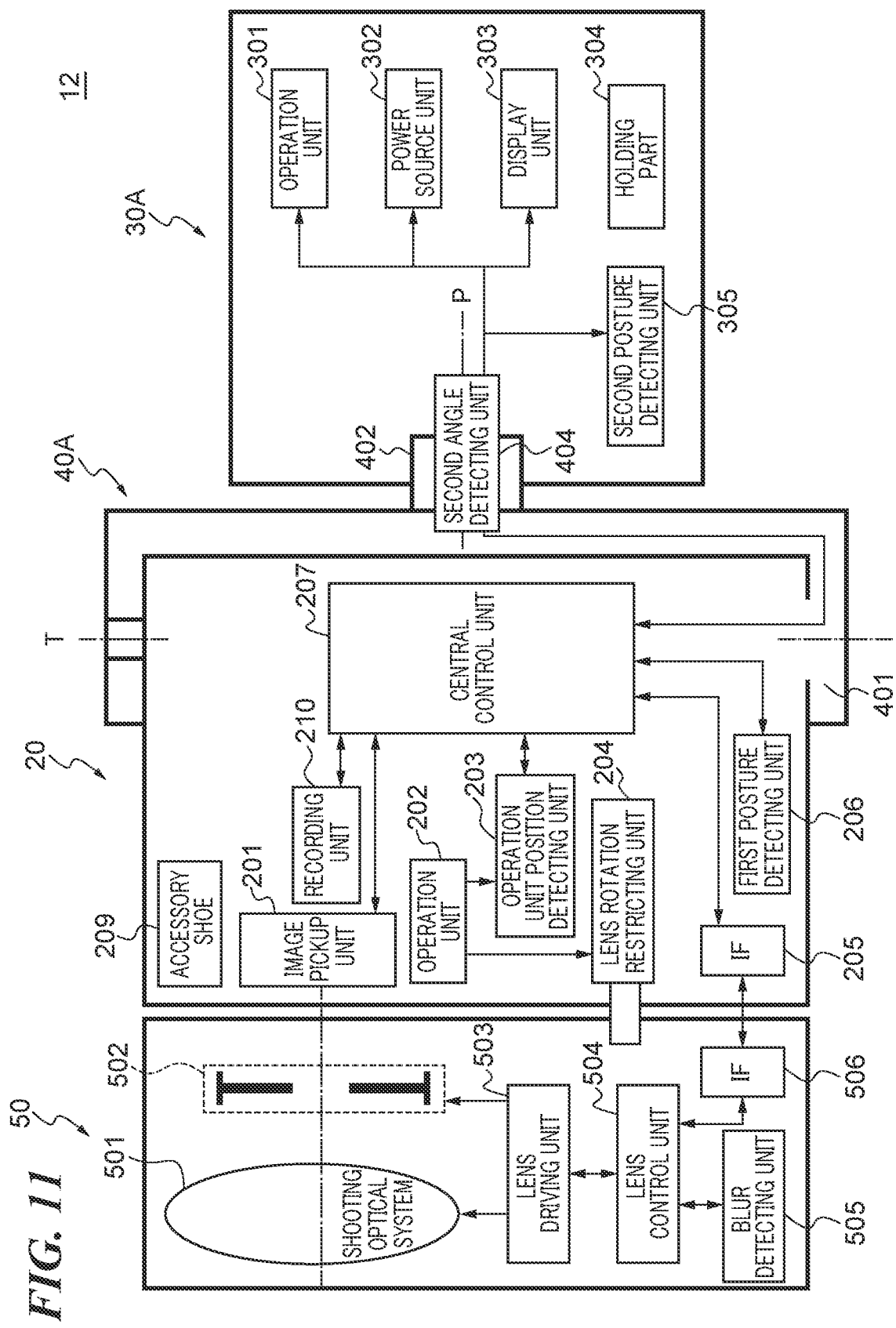
FIG. 11 is a block diagram of an image pickup apparatus according to a third embodiment.

Next, a description will be given of a third embodiment of the present invention. FIG. 11 is a block diagram of an image pickup apparatus 12 according to the third embodiment. Compared to the image pickup apparatus 10 according to the first embodiment, the image pickup apparatus 12 differs in including the fixed unit 30A to which the second posture detecting unit 305 is mounted and a hinge unit 40A which does not include the first angle detecting unit 403. For this reason, among component elements of the image pickup apparatus 12, component elements same as those of the image pickup apparatus 10 are indicated by the same reference numerals in FIG. 11, and thus the explanations thereof are omitted here. Since appearance of the image pickup apparatus 12 is the same as that of the image pickup apparatus 10 (see FIGS. 1A and 1B), an explanation thereof is omitted here.

The fixed unit 30A is the same as the fixed unit 30A of the image pickup apparatus 11 according to the second embodiment. Namely, the configuration of the second posture detecting unit 305 and the directions (the eighth direction and the ninth direction) detected by the central control unit 207 based on the detection signal from the second posture detecting unit 305 conform to the explanations in the second embodiment, and thus explanations thereof are omitted here.

The central control unit 207 determines the posture of the image pickup apparatus 12 based on each of the detection signals from the first posture detecting unit 206 and the second posture detecting unit 305 and performs the display switching control in the vertical direction on the display screen 303a of the display unit 303 based on a determination result.

It should be noted that since the display switching control in the lateral direction on the display screen 303a of the image pickup apparatus 12 is performed in the same manner as the display switching control in the lateral direction on the display screen 303a of the image pickup apparatus 10 according to the first embodiment, an explanation thereof is omitted. The image pickup apparatus 12 may be configured so that the image pickup apparatus 12 does not include the second angle detecting unit 404 and does not perform the lateral inversion of the display.

FIG. 12 is a diagram useful in explaining contents of a display switching of the display screen 303a of the image pickup apparatus 12. The display switching of the display screen 303a in the vertical direction is controlled according to a determination result as to the fourth and fifth directions and a determination result as to the eighth and ninth direction with reference to the forward direction and the normal posture. It should be noted that the definitions of the "forward direction", the "backward direction", the "normal posture", and the "reverse posture" in the third embodiment conform to the definitions in the first embodiment.

Specifically, when the determination results are the fourth direction and the eighth direction and when the determination results are the fifth direction and the ninth direction, the vertical inversion of the display is not performed. When the determination results are the fourth direction and the ninth direction and when the determination results are the fifth direction and the eighth direction, the vertical inversion of the display is performed.

As described above, in the image pickup apparatus 12 according to the third embodiment as well, an appropriate display image is constantly provided to the photographer according to the posture of the image pickup apparatus 12. As a result, the photographer is able to easily check whether the shooting following a photographer's intent is possible or whether the shooting following the photographer's intent is underway through a video (an image) displayed on the display unit 303 even when the posture of the image pickup apparatus 12 is changed in a various manner.

Figure 13:
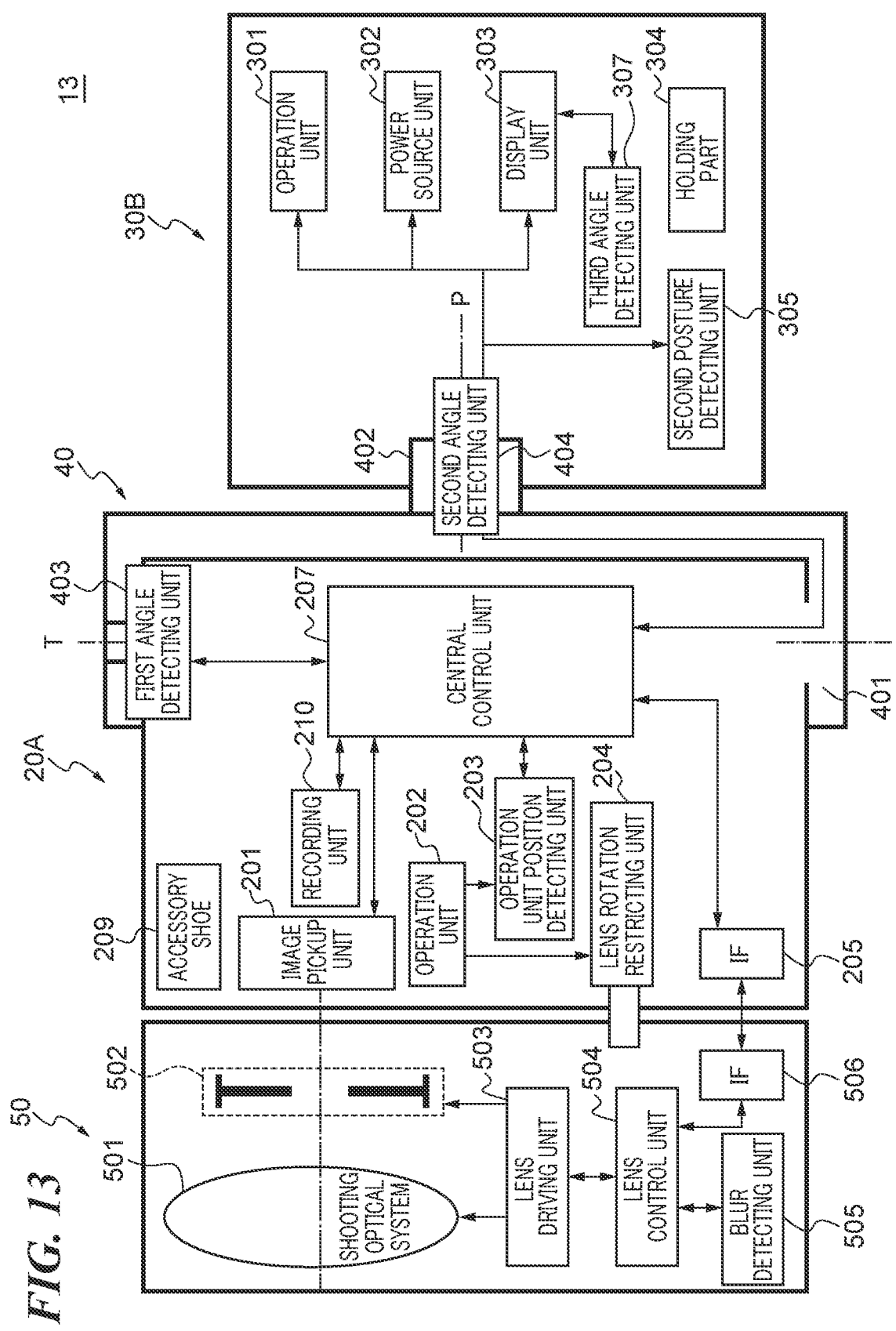
FIG. 13 is a block diagram of an image pickup apparatus according to a fourth embodiment.

Next, a description will be given of a fourth embodiment of the present invention. FIG. 13 is a block diagram of an image pickup apparatus 13 according to the fourth embodiment. Compared to the image pickup apparatus 10 according to the first embodiment, the image pickup apparatus 13 differs in including a fixed unit 30B to which the second posture detecting unit 305 and a third angle detecting unit 307 are mounted and the movable unit 20A which does not include the first posture detecting unit 206. For this reason, among component elements of the image pickup apparatus 13, component elements same as those of the image pickup apparatus 10 are indicated by the same reference numerals in FIG. 13, and thus the explanations thereof are omitted here. Since an appearance of the image pickup apparatus 13 is the same as that of the image pickup apparatus 10 (see FIGS. 1A and 1B), an explanation thereof is omitted here.

Since the configuration of the second posture detecting unit 305 of the fixed unit 30B and the directions (the eighth direction and the ninth direction) detected by the central control unit 207 based on the detection signal from the second posture detecting unit 305 conform to the explanations in the second embodiment, explanations thereof are omitted here.

Since the configuration and function of the first angle detecting unit 305 have already been explained in the first embodiment, the explanations thereof are omitted here. However, in the fourth embodiment, a definition of a rotational direction of the movable unit 20A about the tilting rotation axis T determined by the central control unit 207 based on the detection signal from the first angle detecting unit 403 is different from the definition in the first embodiment.

Figure 14:
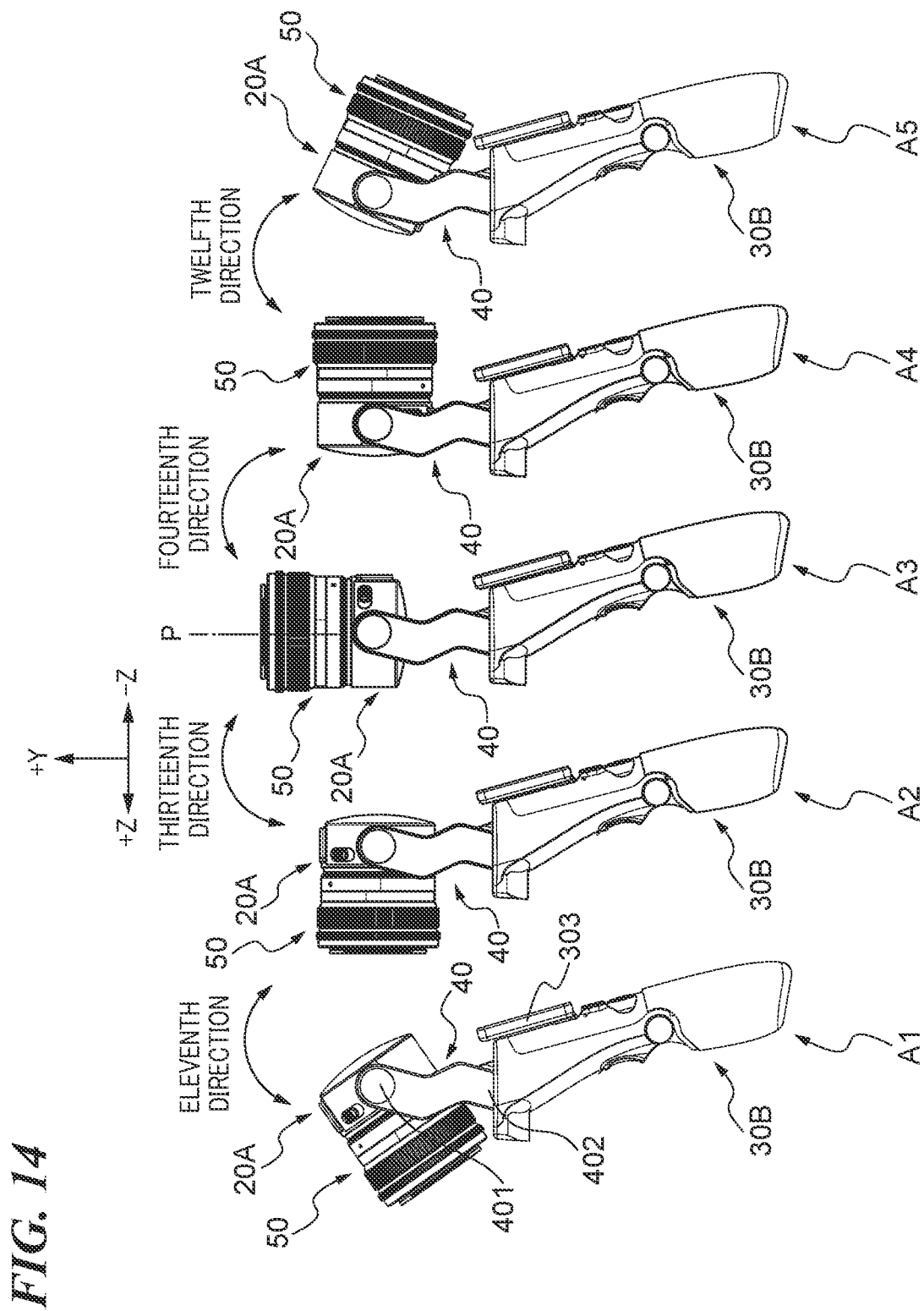
FIG. 14 is a view showing an example of states in a tilting rotation of a movable unit of the image pickup apparatus in the fourth embodiment.

FIG. 14 is a view showing states A1 to A5 in which the movable unit 20A is rotated about the tilting rotation axis T. The states A1 to A5 shown in FIG. 14 are the same as the states A1 to A5 shown in FIG. 4. Moreover, the definitions of the "forward direction" and the "backward direction" conform to the definitions in the first embodiment.

A rotation range (within a rotation phase between the states A1 and A2) from the forward direction to the −Y direction (a direction facing the fixed unit 30B) is defined as an "eleventh direction". A rotation range (within a rotation phase between the states A4 and A5) from the backward direction to the −Y direction with reference to the backward direction is defined as a "twelfth direction". A rotation range (within a rotation phase between the states A2 and A3) from the forward direction to the +Y direction is defined as a "thirteenth direction". A rotation range (within a rotation phase between the states A3 and A4) from the backward direction to the +Y direction is defined as a "fourteenth direction". The rotation angles in the thirteenth and fourteenth directions are 90°, respectively.

It should be noted that when the posture of the movable unit 20A is switched from the state A2 to the state A3, the thirteenth direction is defined to include a case in which the movable unit 20A exceeds the posture corresponding to the state A3 and further rotates by a certain angle. Moreover, when the posture of the movable unit 20A is switched from the state A4 to the state A3, the fourteenth direction is defined to include a case in which the movable unit 20A exceeds the posture corresponding to the state A3 and further rotates by a certain angle. As a result, an unintended display switching of the display screen 303a in the vertical direction is suppressed.

Figure 15A:
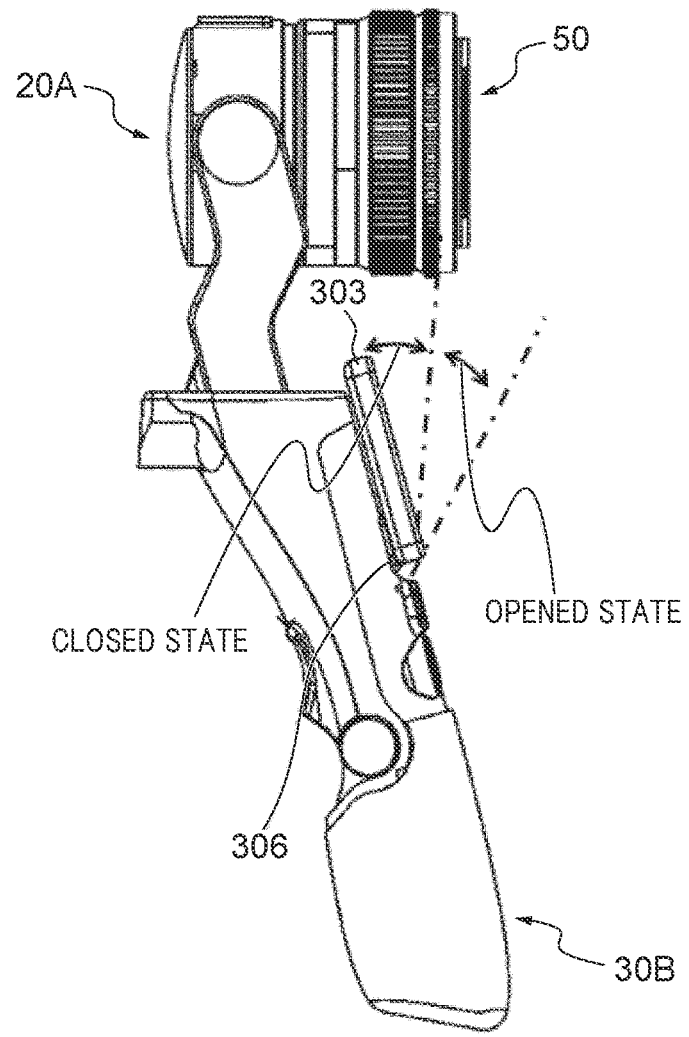
FIGS. 15A and 15B are views for explaining opened and closed states of a display unit of the image pickup apparatus in the fourth embodiment.
Figure 15B:
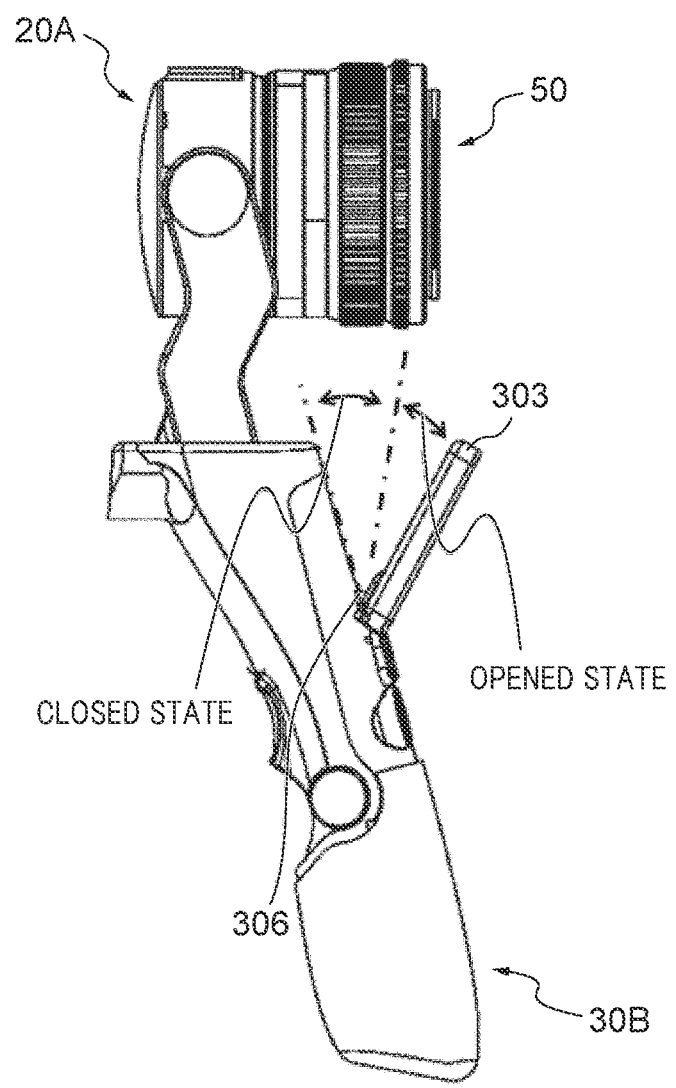

FIGS. 15A and 15B are side views showing a closed state and an opened state of the display unit 303. The third angle detecting unit 307 is comprised of a gyro sensor, an angle sensor, and the like, and detects a rotation angle of a display unit hinge 306. A detection signal output from the third angle detecting unit 307 is transmitted to the central control unit 207 as an analog signal or a digital data. The central control unit 207 determines whether the display unit 303 is in the opened state or the closed state based on the detection signal acquired from the third angle detecting unit 307. In the present embodiment, a state shown in FIG. 15A in which a rear surface of the display unit 303 (a surface opposite to the display screen 303a) abuts the fixed unit 30B is defined as the "closed state", and a state shown in FIG. 15B in which the rear surface of the display unit 303 is apart from the fixed unit 30B is defined as the "opened state".

In the present embodiment, an opening and closing range (opening and closing enabled angle) of the display unit 303 is approximately 45°, and the central control unit 207 switches a detection result as to the opened and closed state at a boundary of approximately 22.5°, which is a middle of the opening and closing range. That is, a range (a second angle range) from a full-opened state of the display unit 303 shown in FIG. 15B to an intermediate position is determined as the opened state, and a range (a first angle range) from the intermediate position to a full-closed state shown in FIG. 15A is determined as the closed state. It should be noted that the opening and closing range of the display unit 303 is not limited to approximately 45°, and the opening and closing range may be narrower, or wider as long as a visibility is secured.

The central control unit 207 determines the posture of the image pickup apparatus 13 including the posture of the display unit 303 based on each of the detection signals from the first angle detecting unit 403, the second posture detecting unit 305, and the third angle detecting unit 307. Then, the central control unit 207 performs the display switching control in the vertical direction on the display screen 303a based on a determination result.

FIG. 16 is a diagram useful in explaining of a display switching of the display screen 303a of the image pickup apparatus 13. The display switching of the display screen 303a in the vertical direction is controlled according to a determination result as to the eleventh to fourteen directions, a determination result as to the eighth and ninth directions, and a determination result as to the opened and closed state of the display unit 303 with reference to the forward direction and the normal posture. It should be noted that the definitions of the "forward direction", the "backward direction", the "normal posture", and the "reverse posture" in the fourth embodiment conform to the definitions in the first embodiment.

In following first to fourth cases, the vertical inversion of the display of the display screen 303a is not performed. The first case corresponds to a case where the determination result is the eleventh direction regardless of another determination result as to the eighth direction and the ninth direction and the determination result as to the opened and closed state of the display unit 303. The second case corresponds to a case where the determination results are the thirteenth direction and the eighth direction regardless of the determination result as to the opened and closed state of the display unit 303. The third case corresponds to a case where the determination results are the thirteenth direction and the ninth direction, and the display unit 303 is determined to be in the closed state. The fourth case corresponds to a case where the determination results are the fourteenth direction and the ninth direction, and the display unit 303 is determined to be in the opened state.

On the other hand, in following fifth to eighth cases, the vertical inversion of the display of the display screen 303a is performed. The fifth case corresponds to a case where the determination result is the twelfth direction regardless of the determination result as to the eighth direction and the ninth direction and the determination result as to the opened and closed state of the display unit 303. The sixth case corresponds to a case where the determination results are the thirteenth direction and the ninth direction, and the display unit 303 is determined to be in the opened state. The seventh case corresponds to a case where the determination results are the fourteenth direction and the eighth direction regardless of the determination result as to the opened and closed state of the display unit 303. The eighth case corresponds to a case where the determination results are the fourteenth direction and the ninth direction, and the display unit 303 is determined to be in the closed state.

According to such a display control, shooting scenes such as a scene in which shooting is performed by hanging the image pickup apparatus 13 at a predetermined position with both hands free and a scene in which shooting is performed from a low-angle are distinguished, and an appropriate display image is constantly provided to the photographer according to the shooting scene. As a result, the photographer is able to easily check whether the shooting following a photographer's intent is possible or whether the shooting following the photographer's intent is underway through a video (an image) displayed on the display unit 303 even when the postures of the image pickup apparatus 13 and the display unit 303 are changed in a various manner.

Next, a description will be given of a fifth embodiment of the present invention. In the fifth embodiment, a shooting method of a moving image content and a display control on an operation screen by the image pickup apparatus 10 according to the first embodiment will be explained.

In Japanese Laid-Open Patent Publication (kokai) No. 2001-313862, which is an example of a conventional art described above, a shooting direction is switched by pivoting the lens unit during recording of a video such as a moving image shooting in some cases. When the moving image thus recorded is reproduced or edited, it is convenient if the photographer is able to easily find out where a scene desired to be checked is. However, according to the technique disclosed in Japanese Laid-Open Patent Publication (kokai) No. 2001-313862, it is not easy to find out a timing of switching of the shooting direction at a time of reproducing the video. Therefore, in the fifth embodiment, switching of the shooting direction in the recorded video is easily find out.

Figure 17:
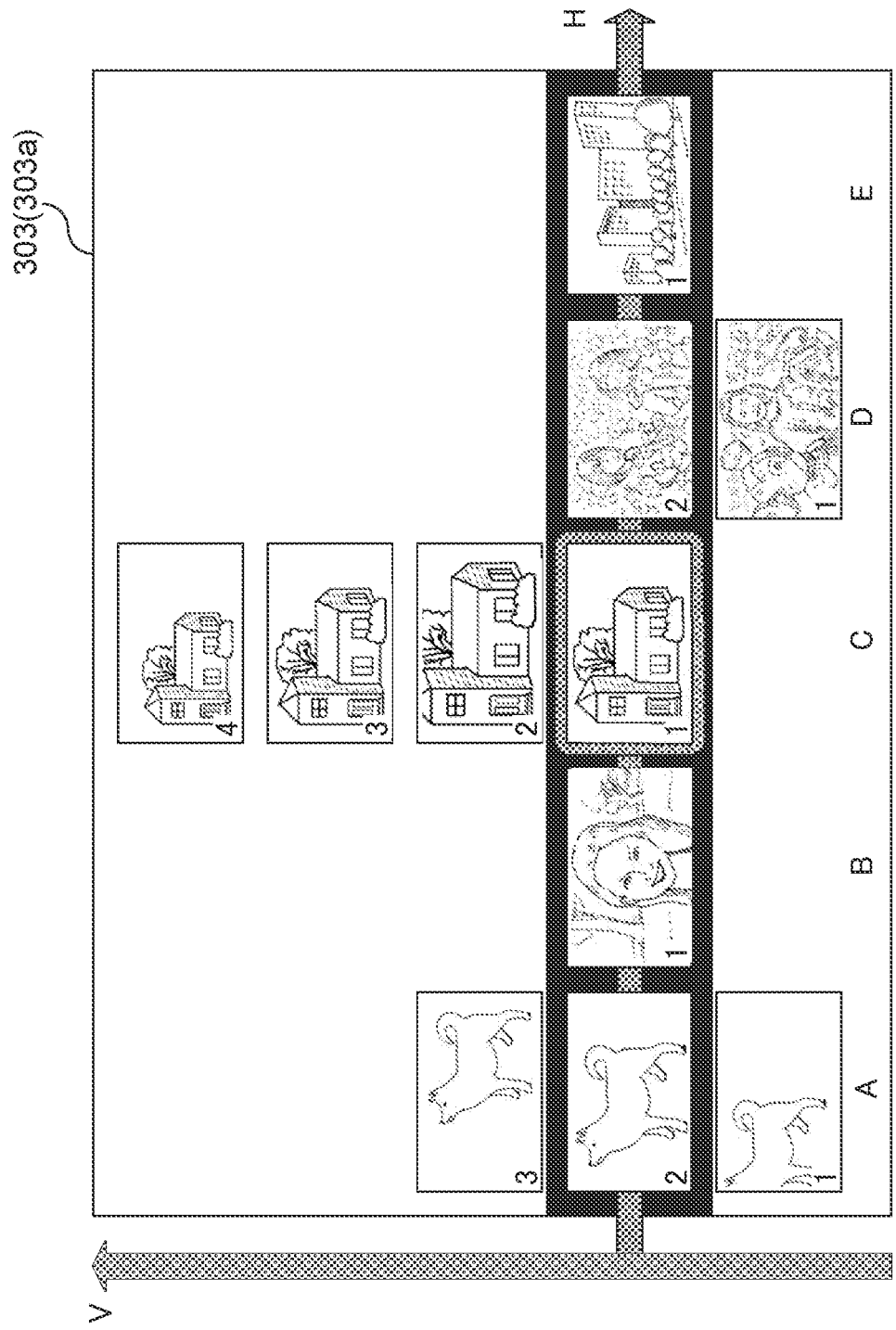
FIG. 17 is a view showing an example of an operation screen to manage a moving image content in the image pickup apparatus.

FIG. 17 is a view showing an example of an operation screen to manage a moving image content (shot video). On the display screen 303a of the display unit 303, reduced images indicating each moving image contents are displayed for each group in an order of a shot time along a direction of an H axis (a longitudinal direction of the display screen 303a). Groups A. C, and D includes a plurality of moving image contents which is displayed along a direction of a V axis (a short direction of the display screen 303a).

The user is able to select an arbitral moving image content from among moving image contents displayed along the H axis by operating the touch pad 301c. The user is able to decide a group to which a moving image content is to belong and associate the group with the moving image content. The user instructs the central control unit 207 to start shooting by pressing down the first button 301a or the second button 301b of the operating unit 301 when shooting a moving image content. When the first button 301a is pressed down and the shooting is started, the shot moving image content is classified into a new group which does not belong to any group. On the other hand, when the second button 301b is pressed down and the shooting is started, the shot moving image content is recognized as a re-shot moving image content and classified into a designated group. A detail thereof will be explained in the following description.

When shooting a new moving image content which does not belong to any group, the user presses down the first button 301a. The new moving image content is recorded in the recording unit 210 with a set shooting condition and information such as a type of the attached lens unit 50. For example, in a case where the first button 301a is pressed down and the shooting is started when the shooting from a group A to a group D has been completed, a group E is created and the new moving image content is managed and displayed as a content 1 of the group E.

On the other hand, when re-shooting, for example, retaking a moving image content to be classified into any groups of moving image contents that has already been shot, the user presses down the second button 301b. The re-shot moving image contents are recorded in the recording unit 210 with the set shooting condition and information such as the type of the attached lens unit 50, and classified into a group to which the last shot moving image content belongs. For example, when the re-shooting is performed under a condition that a content 1 of the group D has been shot at last, the re-shot moving image content is classified into the moving image contents of the group D and managed and displayed as a content 2 of the group D.

However, in some cases, the user selects a specific moving image content from a list of moving image contents displayed on the display screen 303a by using the touch pad 301c before pressing down the second button 301b. In this case, the re-shot moving image content is classified into a group to which the selected moving image content belongs instead of being classified into the group to which the last shot moving image belongs. For example, when a content 2 of the group C has been selected, the re-shot moving image content is classified into the group C and managed and displayed as a content 3 of the group C.

Figure 18:
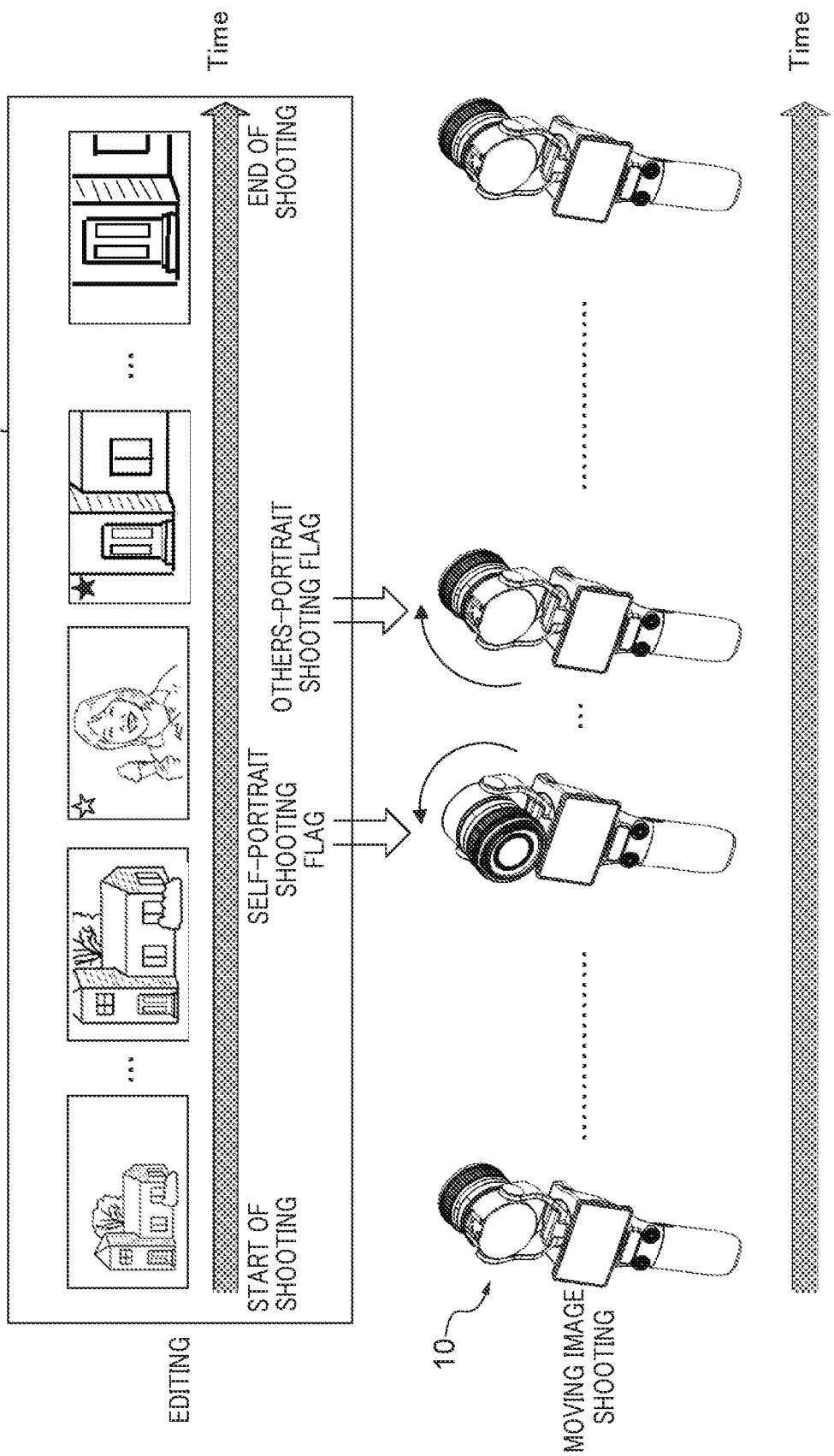
FIG. 18 is a timing chart from a start of shooting to an end of the shooting performed by the image pickup apparatus.

FIG. 18 is a timing chart from a start to an end of shooting of a moving image content. An axis of abscissa in FIG. 18 indicates an elapsed time period Time for a shot moving image content. During shooting of the moving image content, the shooting direction is switched due to the rotations of the tilting rotation hinge 401 and the panning rotation hinge 402 in some cases. In an example shown in FIG. 18, the shooting direction has been switched from the first direction to the second direction, and then switched from the second direction to first direction again. In this manner, a rotation angle range to which a rotational position of the movable unit 20 with respect to the fixed unit 30 belongs is switched during the shooting of the moving image content in some cases.

The central control unit 207 adds, to the moving image content which is a video to be recorded, "switching information" indicating that the rotation angle range to which the rotational position of the movable unit 20 with respect to the fixed unit 30 has been switched at a timing of switching based on posture information of the movable unit 20. As a result, when the moving image content is reproduced or edited, the user easily finds out the timing at which the rotation angle range to which the rotational position of the movable unit 20 has been switched.

The switching information is recorded in the recording unit 210 as a switching flag FLG. The switching flag FLG to be recorded includes switching flags FLG 1 to FLG 7 to be added correspondingly to the first to seventh directions. When the rotational position of the movable unit 20 steps across a border between adjacent rotation angle ranges, the central control unit 207 determines that the rotation angle range to which the rotational position of the movable unit 20 belongs has been switched.

The switching flag FLG includes information indicating a time at which the rotation angle range to which the rotational position of the movable unit 20 belongs has been switched. Moreover, the switching flag FLG includes information indicating rotation angle ranges before and after the switching of the rotation angle range to which the rotational position of the movable unit 20 belongs. For example, when the rotation angle range has been switched from the first direction to the second direction, the first direction is recorded as a rotation angle range before the switching and the second direction is recorded as a rotation angle range after the switching. Such information also indicates a switching direction of the rotation angle range.

It should be noted that the switching flags FLG 1 to 3, the switching flags FLG 5 and 6, and the switching flags FLG 6 and 7 are recorded independently. For example, the switching flags FLG 1 to 3 are first switching information indicating that the rotation angle range of the rotation about the tilting rotation axis T (a first rotation axis) has been switched. The switching flags FLG 5 and 6 are switching information based on the detection result of the first posture detecting unit 206. The switching flags FLG 6 and 7 are second switching information indicating that the rotation angle range of the rotation about the panning rotation axis P (a second rotation axis) has been switched.

Regarding a certain rotational direction, the rotation angle range may be segmented into three or more ranges. The switching flag FLG may be recorded only in a case where the rotation angle range after the switching corresponds to a predetermined rotation angle range among the three or more rotation angle ranges. For example, regarding the rotation about the tilting rotation axis T, the switching flag FLG 2 may be abolished. Namely, when the rotation angle range has been switched from the second direction to the third direction, the third direction as the rotation angle range after the switching as well as the first direction, not the second direction, as the rotation angle range before the switching may be recorded in the switching FLG 3.

As will be described below, a flag depending on an angle and a speed of the rotation as well as information such as the time and direction of the switching are added to the shot moving image content. The flag to be added is expressed by a unique symbol, a simplified character, or the like. For example, in FIG. 18, a self-portrait shooting flag and an others-portrait shooting flag are expressed by starts in different colors.

By adding various flags such as the switching flag FLG to the moving image content, it becomes easy to set a target for editing when the moving image content is edited, and a time period required for editing the moving image content is shortened. As an aspect of editing the moving image content, an aspect to connecting contents selected by the user from among a plurality of contents which belong to respective groups one by one and completing one moving image content. However, the aspect is not limited to this. By using an added flag as a check point, for example, the moving image content can be easily edited. Moreover, when the moving image content is reproduced, a reproduction from a position of an added flag by using the added flag as a capture. As a result, the shot moving image content can be easily checked, and thus a time period required for editing is shortened. When the moving image content is reproduced, a reproduction can be started from a switching timing of the shooting direction indicated by the added flag.

It should be noted that as shown in FIG. 17, although a direction to arrange the groups is referred to as the direction of the H axis, and a direction to arrange the moving image contents which belong to respective groups is referred to as the direction of the V axis, the direction to arrange the groups is not limited to this, and may be another direction such as a diagonal direction and a direction along an arc.

Figure 19A:
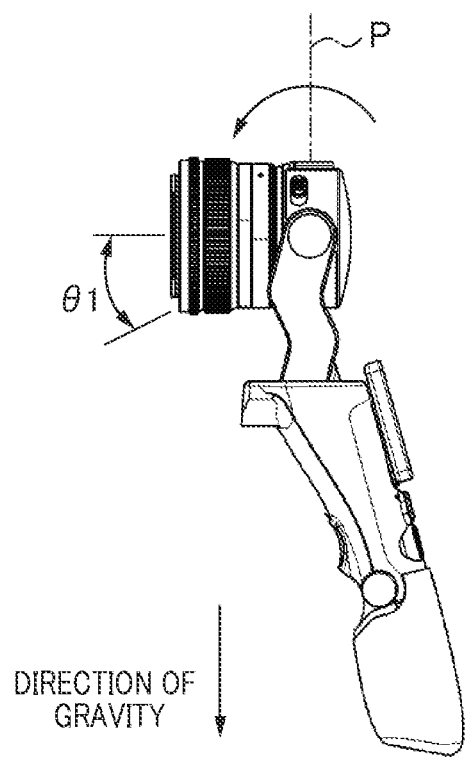
FIGS. 19A and 19B are views showing examples of postures of the image pickup apparatus.
Figure 19B:
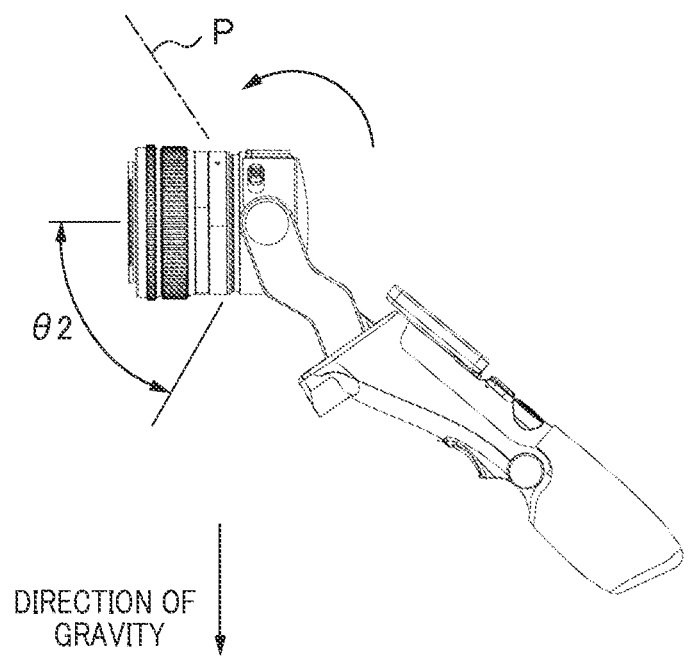

FIGS. 19A and 19B are views showing examples of the posture of the image pickup apparatus 10. Whether to add the switching flags FLG 1 to 3 may be determined by considering not only the rotation of the tilting rotation hinge 401 but the posture of the fixed unit 30 or the movable unit 20.

In the posture shown in FIG. 19A, the panning rotation axis P is parallel to the direction of gravity. In this posture, a range of an angle θ1 corresponds to the first direction is the same as the range between the state A1 and the state A2 in FIG. 4. On the other hand, in the posture shown in FIG. 19B, the panning rotation axis P is inclined with respect to the direction of gravity. In this posture, a range of an angle θ2 corresponds to the first direction. That is, the range of the angle θ2 from a rotational position where a direction to which the lens unit 50 faces by considering the posture of the image pickup apparatus 10 is horizontal to the direction of gravity to a rotational limit where a direction to which the lens unit 50 faces has a component in the direction of gravity corresponds to the first direction. The angle θ2 is larger than the angle θ1. The central control unit 207 changes the first to third directions to be detected based on the detection signals from the first angle detecting unit 403 and the first posture detecting unit 206.

It should be noted that the first posture detecting unit 206 may be able to detect the posture of the fixed unit 30. Otherwise, posture detecting units may be provided for the movable unit 20 and the fixed unit 30, respectively, similar to the image pickup apparatus 12 according to the third embodiment.

When the first posture detecting unit 206 which does not detect the posture of fixed unit 30 but detects the posture of the movable unit 20 is provided, processing is performed in the following manner That is, the central control unit 207 decides a rotation angle of the movable unit 20 with respect to the fixed unit 30 in which the optical axis is horizontal based on the posture of the movable unit 20 and the rotational position of the movable unit 20 about the tilting rotation axis T with respect to the fixed unit 30. Subsequently, the central control unit 207 makes a change so that the decided rotation angle becomes the boundary between the first direction and the third direction. In this case, when the first direction is changed and the angle θ2 becomes large, the second direction may disappear.

When the posture detection unit which does not detect the posture of movable unit 20 but detect the fixed unit 30 is provided, processing is performed in the following manner. That is, the central control unit 207 decides a rotation angle of the movable unit 20 about the tilting rotation axis T with respect to the fixed unit 30 in which the optical axis is horizontal based on the posture of the fixed unit 30, and sets the decided rotation angle as the boundary between the first direction and the third direction. The change in the boundary between the rotation angle ranges may be applied not only to the rotation about the tilting rotation axis T but to the rotation about the panning rotation axis P.

Figure 20:
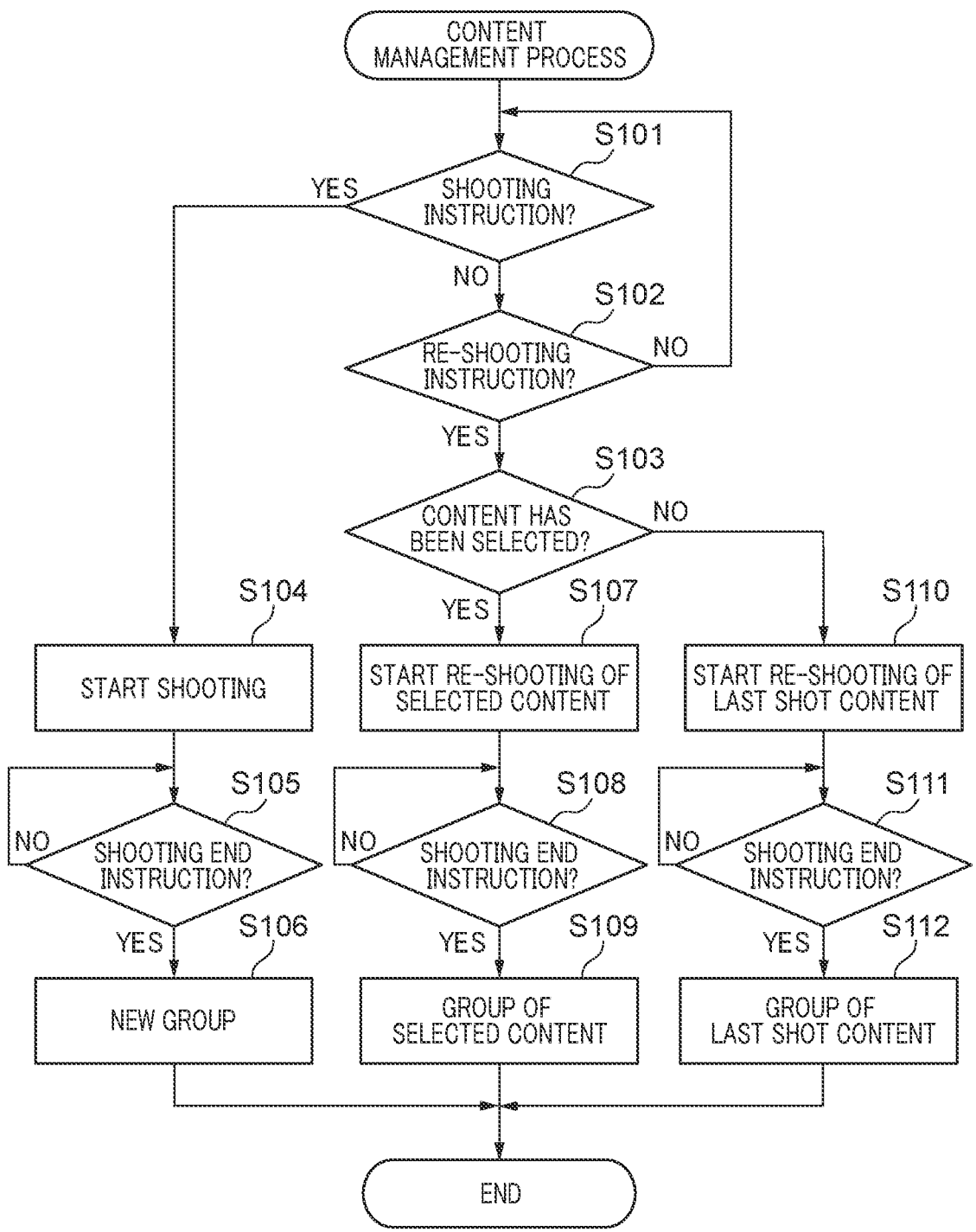
FIG. 20 is a flowchart of a moving image content managing process.

FIG. 20 is a flowchart of a moving image content management process. Each step shown by S-number in the flowchart in FIG. 20 is realized by a CPU of the central control unit 207 reading and executing a program stored in a storage unit such as a ROM of the central control unit 207. This process is started when a power source of the image pickup apparatus 10 is turned on.

In step S101, the central control unit 207 determines whether a shooting instruction has been input. In this step, when the first button 301a has been pressed down, it is determined that the shooting instruction has been input. When determining that the shooting instruction has not been input, the central control unit 207 determines whether a re-shooting instruction has been input in step S102. In this step, when the second button 301b has been pressed down, it is determined that the re-shooting instruction has been input. When determining that the re-shooting instruction has not been input, the central control unit 207 returns the process to the step S101.

When determining that the shooting instruction has been input in the step S101, the central control unit 207 starts a shooting process in step S104. Shot data (video) is sequentially recorded in the recording unit 210. Then, in step S105, the central control unit 207 continues the shooting until a shooting end instruction is input. In this step, when the first button 301a or the second button 301b has been pressed down, it is determined that the shooting end instruction has been input. When determining that the shooting end instruction has been input, the central control unit 207 classifies data shot this time into a moving image content of a new group which does not belong to any group and records the shot data in the recording unit 21 in step S106, and then ends the present process.

As a result of the determination in the step S102, when determining that the re-shooting instruction has been input, the central control unit 207 determines whether a specific moving image content has been selected immediately before the input of the re-shooting instruction in step S103. When determining that the specific moving image content has been selected, the central control unit 207 starts the re-shooting of the selected moving image content in step S107 and sequentially records shot data in the recording unit 210. Then, the central control unit 207 continues the shooting until the shooting end instruction is input in step S108. In this step, when the first button 301a or the second button 301b has been input, it is determined that the shooting end instruction has been input. When determining that the shooting end instruction has been input, the central control unit 207 classifies data shot this time into a group to which the selected moving image content belongs and records the shot data in the recording unit 210, and then ends the present process.

As a result of the determination in the step S103, when determining that the specific moving image content has not been selected, the central control unit 207 starts the re-shooting of the last shot moving image content and sequentially records the shot data in the recording unit 210 in step S110. Subsequently, the central control unit 207 continues the shooting until the shooting end instruction is input in step S111. In this step, when the first button 301a or the second button 301b has been pressed down, it is determined that the shooting end instruction has been input. When determining that the shooting end instruction has been input, the central control unit 207 classifies the shot data this time into the group to which the last shot moving image content belongs and records the shot data in the recording unit 210 in step S112, and then ends the present process.

Figure 21:
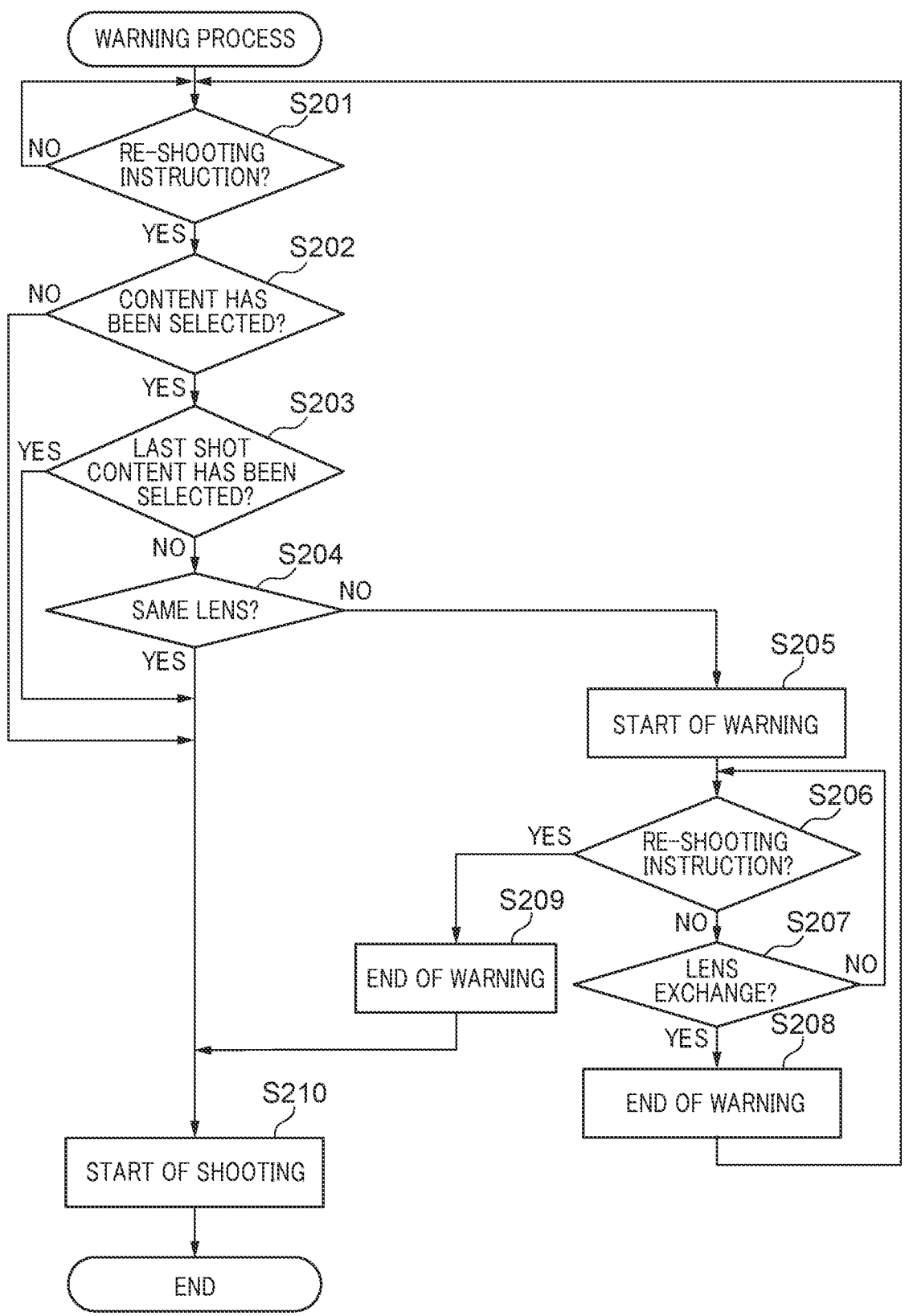
FIG. 21 is a flowchart of a warning process.

FIG. 21 is a flowchart of a warning process. This process is a modification of the process shown in FIG. 20. Specifically, in the flowchart in FIG. 21, processing of steps S201 to S210 is performed in place of the steps S102 and S103 in FIG. 20.

When determining "No" in the step S101, the central control unit 207 determines whether the re-shooting instruction has been input in the step S201 similar to the step S102 and stands by until the re-shooting instruction is input. When determining that the re-shooting instruction has been input, the central control unit 207 determines whether a specific moving image content has been selected immediately before the re-shooting instruction is input in the step S202 similar to the step S103. When determining that the specific moving image content has not been selected, the central control unit 207 proceeds the process to the step S210 to start the shooting. In this case, processing of re-shooting the last shot moving image content shown in the step S110 and subsequent steps in FIG. 20 is performed.

As a result of the determination in the step S202, when the specific moving image content has been selected, the central control unit 207 determines whether the selected moving image content is the last shot moving image content in the step S203. When determining that the selected moving image content is the last shot moving image content, the central control unit 207 proceeds the process to the step S210 to start the shooting. In this case as well, the processing of re-shooting the last shot moving image content shown in the step S110 and subsequent steps in FIG. 20 is performed.

As a result of the determination in the step S203, when determining that the selected moving image content is not the last shot moving image content, the central control unit 207 proceeds the process to the step S204. In the step S204, the central control unit 207 reads information indicating the type of the lens unit 50 attached when the selected moving image content has been shot from the recording unit 210 and determines whether the type of the lens unit 50 is the same as a type of the currently attached lens unit 50. It should be noted that the information of the lens unit 50 is stored every time the lens unit 50 is attached to the movable unit 20. When determining that the types of the lens unit 50 are the same, the central control unit 207 proceeds the process to the step S210 to start the shooting since there is no risk to perform the re-shooting with the lens unit 50 different from that used when the selected moving image content has been shot. In this case, the processing of re-shooting the selected moving image content shown in the step S107 and subsequent steps in FIG. 20 is performed.

As a result of the determination in the step S204, when the type of the lens unit 50 attached when the selected moving image content has been shot is not the same as the type of the currently attached lens unit 50, the central control unit 207 proceeds the process to step S205. In the step S205, the central control unit 207 displays a warning exemplified in FIG. 22 on the display screen 303a of the display unit 303.

Figure 22:
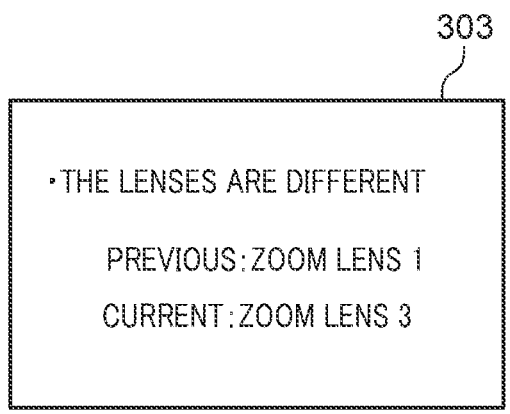
FIG. 22 is a diagram showing an example of a warning to be displayed on the display unit.

FIG. 22 is a diagram showing an example of a warning content displayed on the display screen 303a. On the display screen 303a, respective names of the (previous) lens unit 50 attached when the selected moving image content has been shot and the currently attached (current) lens unit 50 are displayed. The name of the previous lens unit 50 is "ZOOM LENS 1", the name of the current lens unit 50 is "ZOOM LENS 2", and the respective names are displayed. A message of "Lens is different" to notify that the types of the previous lens unit 50 and the current lens unit 50 is displayed as well as the names of the lens units 50. As a result, the fact that the types of the lens units 50 are different between the one attached when the selected moving image content has been shot and the one attached currently is notified to the user.

In step S206 subsequent to the step S205, the central control unit 207 determines whether a re-shooting start instruction has been input by pressing down of the first button 301a or the second button 301b. When determining that the re-shooting start instruction has not been input, the central control unit 207 determines whether the current lens unit 50 has been exchanged to the previous lens unit 50 in step S207. When it cannot be confirmed that the current lens unit 50 is exchanged to the previous lens unit 50, the central control unit 407 returns the process to the step S206. As a result, the re-shooting with the lens unit 50 different from that used when the selected moving image content has been shot can be suppressed.

On the other hand, when it can be confirmed that the current lens unit 50 is exchanged to the previous lens unit 50, the central control unit 207 ends a warning display displayed on the display screen 303a in step S208 and returns the process to the step S201. As a result of the determination in the step S206, when the re-shooting start instruction has been input, the central control unit 207 ends the warning display displayed on the display screen 303a and proceeds the process to step S210. In this case, processing of re-shooting the selected moving image content in the step S107 and subsequent steps in FIG. 20 is performed. After finishing processing in the step S210, the central control unit 207 ends the process shown in FIG. 21.

As described above, in a case where the types of attached lens units 50 are different between the lens unit 50 attached when the selected moving image content has been shot and that attached currently when the re-shooting is performed, the warning is displayed on the display screen 303a. As a result, it is possible to prevent an unintentional re-shooting with the lens unit 50 different from that used when the selected moving image content has been shot. Moreover, by prompting the photographer to exchange the lens unit 50, it becomes possible to perform the re-shooting with the lens unit 50 same as that previously used. Furthermore, even when the warning is displayed, the shooting is started if the re-shooting start instruction is input again (YES in the step S206). Accordingly, even when the lens unit 50 is intentionally exchanged, it is possible to perform the re-shooting.

It should be noted that in a case where the last shot moving image content is selected when the moving image content is selected, the warning is not displayed even if the types of the lens units 50 are different between the lens unit 50 attached when the selected moving image content has been shot and that attached currently (YES in the step S203). This is because a case where the types of the lens units 50 are different irrespective of performing the re-shooting of the last shot moving image content can be determined that the user is likely to intentionally exchange the lens unit 50.

Figure 23:
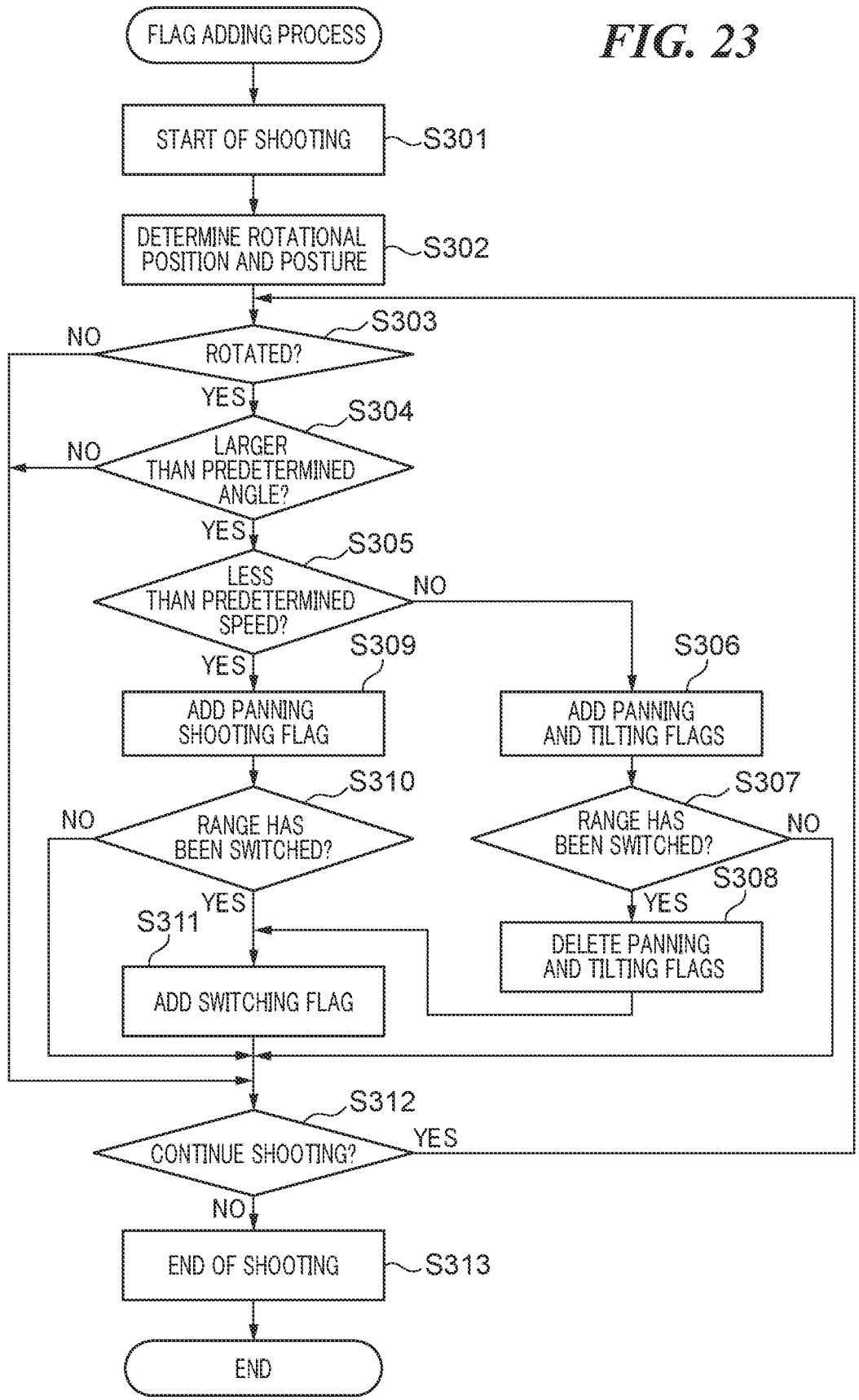
FIG. 23 is a flowchart of a flag adding process performed during shooting of a moving image content.

FIG. 23 is a flowchart of a flag adding process during shooting of the moving image content. This process is started in response to the start of the shooting in any of the steps S104, S107, and S110 in FIG. 20 and performed in parallel to the process shown in FIG. 20. In this process, the central control unit functions as a controller in the present invention.

In step S301, the central control unit 207 starts the shooting. In step S302, the central control unit 207 determines the posture of the image pickup apparatus 10 based on the detection signal from the first posture detecting unit 206. Moreover, the central control unit 207 determines the rotational positions of the movable unit 20 about the tilting rotation axis T and the panning rotation axis P with respect to the fixed unit 30 based on the detection signals from the first angle detecting unit 403 and the second angle detecting unit 40.

In step S303, the central control unit 207 determines whether a rotational operation in the panning direction or the tilting direction (hereinafter, collectively referred to as the "rotational operation") has been performed. When determining that the rotational operation has not been performed, the central control unit 207 proceeds the process to step S312. On the other hand, when determining that the rotational operation has been performed, the central control unit 207 proceeds the process to step S304. It should be noted that when the panning operation and the tilting operation are performed as the rotational operation, processing of step S304 and subsequent steps for the panning operation and the tilting operation are performed in parallel.

In step S304, the central control unit 207 determines whether an amount of rotation due to the rotational operation is larger than a predetermined angle. It should be noted that in the step S304, an amount of rotation due to a current operation, that is, an amount of rotation after the determination of "YES" in the step S303 last time (an angle by which the movable unit 20 has displaced without stopping the same) is used for the determination. When the amount of rotation due to the rotational operation is equal to or less than the predetermined angle, the central control unit 207 proceeds the process to the step S312. Therefore, when a change in the rotational position of the movable unit 20 larger than the predetermined angle is not detected, the switching flag FLG and other flags are not associated with the moving image content to be recorded. It is because such rotational operation is determined as an operation only for the purpose of fine adjustment.

As a result of the determination in the step S304, when the amount of rotation due to the rotational operation is larger than the predetermined angle, the central control unit 207 determines whether a speed of rotation due to the rotational operation is smaller than a predetermined speed in step S305. The speed of rotation is calculated based on a change in the rotation angle within a unit time. When the speed of rotation due to the rotational operation is less than the predetermined speed, the rotation of the movable unit 20 slower than the predetermined speed has been detected, and it is conceivable that the user slowly performs the rotational operation of the movable unit 20 for the panning shooting. Accordingly, the central control unit 207 associates a panning shooting flag (second information) different from the switching flag FLG with a video to be recorded in step S309. The panning shooting flag is added respectively to the panning operation and the tilting operation, and the panning shooting flags for the panning operation and the tilting operation may be added in combination.

Next, in step S310, the central control unit 207 determines whether the rotation angle range to which the rotational position of the movable unit 20 with respect to the fixed unit 30 has been switched (stepped across the boundary). When determining that the rotation angle range has been switched, the central control unit 207 associates the switching flag FLG with a moving image content to be recorded in step S311. As described above, information indicating the rotation angle ranges before and after the switching and information indicating the switching timing are added to a video to be recorded.

After that, the central control unit proceeds the process to the step S312. On the other hand, as a result of the determination in the step S310, when determining that the rotation angle range has not been switched, the central control unit 207 proceeds the process to the step S312 without adding the switching flag FLG.

As a result of the determination in the step S305, when the speed of rotation due to the rotational operation is not smaller than the predetermined speed, the rotation of the movable unit 20 faster than the predetermined speed has been detected, and it is conceivable that the user intentionally performs the panning or the tilting operation. Accordingly, the central control unit 207 associates a panning flag or a tilting flag (first information) different from the switching flag FLG with a moving image content to be recorded in step S306. The panning flag and the tilting flag may be added in combination.

Subsequently, in step S307, the central control unit 207 determines whether the rotation angle range to which the rotational position of the movable unit 20 with respect to the fixed unit 30 has been switched after the panning flag or the tilting flag is added and before a predetermined time period elapses. When determining that the rotation angle range has not been switched after the panning flag or the tilting flag is added and before the predetermined time period elapses, the central control unit 207 proceeds the process to the step S312. Therefore, the panning flag or the tilting flag is maintained, and the switching flag FLG is not added. However, when determining that the rotation angle range has been switched after the panning flag or the tilting flag is added and before the predetermined time period elapses, the central control unit 207 proceeds the process to the step S308.

In the step S308, the central control unit 207 deletes the panning flag or the tilting flag associated with the moving image content and then proceeds the process to step S311. Therefore, in a case where a quick panning operation or a quick tilting operation has been performed and immediately after that the movable unit 20 has been largely rotated before the predetermined time period elapses, the switching flag FLG is added instead of deleting the panning flag or the tilting flag. As a result, the switching information following the user's intention is added.

In the step S312, the central control unit 207 determines whether to continue the shooting. In this step, when the shooting end instruction is input by the pressing down of the first button 301a or the second button 301b, it is determined that the shooting is not continued. When determining to continue the shooting, the central control unit 207 returns the process to the step S303. When determining not to continue the shooting, the central control unit 207 performs shooting end processing in step S313 and ends the process shown in FIG. 23. The shot video is recorded in the recording unit 210 together with the flag.

In the fifth embodiment as described above, in a case where the switching of the rotation angle range to which the rotational position of the movable unit 20 with respect to the fixed unit 30 belongs has been detected during the shooting, the switching flag FLG (switching information) is associated with the video to be recorded in the recording unit 210. As a result, the user easily understands the switching of the shooting direction in the recorded video, and thus the moving image content is conveniently reproduced or edited. In particular, since the switching flag FLG includes information indicating a time at which the rotation angle range has been switched, the switching direction, and the rotation angel ranges before and after the switching, an operation as to the reproduction or the editing of the moving image content is significantly easy. For example, when the recorded video is reproduced, the reproduction is started from a switching timing indicated by the switching flag FLG (the time at which the rotation angle range has been switched).

Moreover, since the switching flag FLG is added for each of the rotation about the tilting rotation axis T and the rotation about the panning rotation axis P, the switching of the shooting direction can be recognized in more detail. Furthermore, since the panning flag or the tilting flag other than the panning shooting flag is added as the flag different from the switching flag FLG depending on the speed of the panning or the tilting operation, the rotational operation performed at the time of the shooting can be confirmed in detail at the time of reproduction or editing.

Additionally, even after the panning flag or the tilting flag is added, the panning flag or the tilting flag is deleted if the movable unit 20 is largely rotated within the predetermined time period, and instead, the switching flag FLG is added. Therefore, the user's intention is appropriately reflected to each added flag. Moreover, since the flag is not added depending on the rotational position of the movable unit 20 equal to or less than the predetermined angle, it can be avoided that a search of a scene is difficult by adding too much flags frequently.

It should be noted that the present invention can be applied to a configuration in which the lens unit 50 is not attachable to the movable unit 50. Moreover, although the present invention is applied to the configuration including the hinge unit 40 of the biaxial hinge, the present invention may be applied to a hinge unit of a uniaxial hinge depending on a desired effect. Therefore, the present invention can be applied to an image pickup apparatus including only one of a tilting rotation mechanism and a panning rotation mechanism.

In the embodiments described above, the detecting units such as the first posture detecting unit 206 and the first angle detecting unit 403 each output only the detection signal, and the central control unit 207 which has received the detection signal determines the directions. However, the present invention is not limited to this. The detecting units may each determine the directions based on the detection signal, and the central control unit 207 may perform the display control on the display unit 303 based on a detection determination result of each of the detecting units.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2020-067880, filed Apr. 3, 2020, Japanese Patent Application No. 2020-067881, filed Apr. 3, 2020, and Japanese Patent Application No. 2021-034709, filed Mar. 4, 2021, which are hereby incorporated by reference herein in their entirety.

What is claimed is:

1. An image pickup apparatus comprising:
an image pickup device;
a main body including a display;
a hinge member that connects the image pickup device and the main body rotatably about at least one axis; and
at least one processor, the at least one processor functioning in accordance with a program stored in a memory as:
a first detector that detects a rotation phase of the image pickup device about the one axis with respect to the main body;
a second detector that detects a posture of the image pickup device; and
a display controller that performs a vertical inversion of a display of an image picked up by the image pickup device on the display in accordance with detection results of the first detector and the second detector;
wherein the display controller does not perform the vertical inversion on the display in a case where a value within a first rotation phase is detected by the first detector, and a case where a value within a third rotation phase is detected by the first detector, and a posture of the image pickup device in which an image the vertical direction of which is the same as that of a subject is generated is detected by the second detector, and
the display controller performs the vertical inversion on the display in a case where a value within a second rotation phase is detected by the first detector and a case where a value within the third rotation phase is detected by the first detector and a posture of the image pickup device in which an image the vertical direction of which is opposite to that of the subject is generated is detected by the second detector.

2. The image pickup apparatus according to claim 1, wherein the first detector detects a rotation angle of the image pickup device relative to the main body, and
the second detector detects an absolute posture of the image pickup device.

3. The image pickup apparatus according to claim 1, further comprising a movable member including the image pickup device,
wherein the movable member further includes a mount to which an interchangeable lens is attached, and
the hinge member connects the movable member and the main body rotatably about at least one axis.

4. An image pickup apparatus comprising:
an image pickup device;
a main body including a display;
a hinge member that connects the image pickup device and the main body rotatably about at least one axis; and
at least one processor, the at least one processor functioning in accordance with a program stored in a memory as:
a first detector that detects a rotation phase of the image pickup device about the one axis with respect to the main body;
a second detector that detects a posture of the image pickup device; and
a display controller that performs a vertical inversion of a display of an image picked up by the image pickup device on the display in accordance with detection results of the first detector and the second detector;
wherein the at least one processor further functions as a third detector that detects a rotation angle of the image pickup device in a panning direction with respect to the main body,
the hinge member supports the image pickup device rotatably in a tilting direction and the panning direction with respect to the main body,
the first detector detects a rotation angle of the image pickup device in the tilting direction with respect to the main body, and
the display controller does not perform a lateral inversion on the display in a case where a value within a fourth rotation phase is detected by the third detector, and performs the lateral inversion on the display in a case where a value within a fifth rotation phase is detected by the third detector.

5. An image pickup apparatus comprising:
a movable member including an image pickup device that picks up a subject;
a main body;
a hinge member that connects the movable member and the main body rotatably relative with each other;
a recorder that records a video picked up by the image pickup device; and
at least one processor, the at least one processor functioning in accordance with a program stored in a memory as:
a detector that detects a rotation angle of the movable member with respect to the main body; and
a controller that associates, in a case where switching of a rotation angle range to which a rotational position of the movable member with respect to the main body belongs has been detected during shooting by the image pickup device, switching information indicating that the rotation angle range to which the rotational position belongs has been switched with a video to be recorded by the recorder,
wherein the switching information includes information indicating a time at which the rotation angle range to which the rotational position belongs has been switched.

6. The image pickup apparatus according to claim 5,
wherein when the video is reproduced, the controller starts reproducing the video based on the time at which the rotation angle range to which the rotational position belongs has been switched indicated by the switching information.

7. The image pickup apparatus according to claim 5,
wherein the switching information includes information indicating the rotation angle ranges before and after the switching.

8. The image pickup apparatus according to claim 5,
wherein the at least one processor further functions as a posture detector that detects a posture of the image pickup apparatus with respect to a direction of gravity,
the rotation angle range is segmented into a plurality of ranges, and
the controller changes a boundary which is a position to switch the rotation angle range based on the posture detected by the posture detector.

9. The image pickup apparatus according to claim 5,
wherein the rotation angle range is segmented into a plurality of ranges, and
one of the plurality of ranges corresponding to a rotation angle range for self-portrait shooting in which a photographer oneself is a subject.

10. The image pickup apparatus according to claim 5,
wherein the hinge member rotatably connects the movable member and the main body relatively with each other about a first rotation axis and a second rotation axis perpendicular to the first rotation axis, and
the switching information includes first switching information indicating that the rotation angle range to which the rotational position of the movable member with respect to the main body for the first rotation axis has been switched and second information indicating that the rotation angle range to which the rotational position of the movable member with respect to the main body for the second rotation axis has been switched.

11. The image pickup apparatus according to claim 5,
wherein in a case where a rotation of the movable member faster than a predetermined speed has been detected during the shooting by the image pickup device, the controller associates first information different from the switching information with the video to be recorded.

12. The image pickup apparatus according to claim 11,
wherein in a case where the switching of the rotation angle range to which the rotational position belongs is detected after the first information is associated with the video and before a predetermined time period elapses, the controller deletes the first information associated with the video and associates the switching information with the video.

13. The image pickup apparatus according to claim 11,
wherein in a case where a rotation of the movable member not faster than the predetermined speed has been detected the during the shooting by the image pickup device, the controller associates second information different from any of the switching information and the first information with the video to be recorded.

14. The image pickup apparatus according to claim 5,
wherein the movable member is able to rotate not less than 180° relatively to the main body via the hinge member.

15. The image pickup apparatus according to claim 5,
wherein a shooting lens is attachable to the movable member.

16. An image pickup apparatus comprising:
a movable member including an image pickup device that picks up a subject;
a main body;
a hinge member that connects the movable member and the main body rotatably relative with each other;
a recorder that records a video picked up by the image pickup device; and
at least one processor, the at least one processor functioning in accordance with a program stored in a memory as:
a detector that detects a rotation angle of the movable member with respect to the main body; and
a controller that associates, in a case where switching of a rotation angle range to which a rotational position of the movable member with respect to the main body belongs has been detected during shooting by the image pickup device, switching information indicating that the rotation angle range to which the rotational position belongs has been switched with a video to be recorded by the recorder,
wherein the switching information includes information indicating a switching direction of the rotation angle range to which the rotational position belongs.

17. An image pickup apparatus comprising:
a movable member including an image pickup device that picks up a subject;
a main body;
a hinge member that connects the movable member and the main body rotatably relative with each other;
a recorder that records a video picked up by the image pickup device; and
at least one processor, the at least one processor functioning in accordance with a program stored in a memory as:
a detector that detects a rotation angle of the movable member with respect to the main body; and
a controller that associates, in a case where switching of a rotation angle range to which a rotational position of the movable member with respect to the main body belongs has been detected during shooting by the image pickup device, switching information indicating that the rotation angle range to which the rotational position belongs has been switched with a video to be recorded by the recorder,
wherein in a case where a change in a rotational position of the movable member larger than a predetermined angle has not been detected during the shooting by the image pickup device, the controller does not associate the switching information with the video.

* * * * *